(12) United States Patent
Musser et al.

(10) Patent No.: US 8,751,381 B2
(45) Date of Patent: Jun. 10, 2014

(54) DEMAND DEPOSIT ACCOUNT PAYMENT SYSTEM

(75) Inventors: Paul Musser, Pilot Hill, CA (US);
Patricia Preston, New York, NY (US);
Richard Rozbicki, Danbury, CT (US);
Julie Delker, Wentzville, MO (US);
Dennis J. Hill, St. Paul, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/403,866

(22) Filed: Feb. 23, 2012

(65) Prior Publication Data

US 2012/0215688 A1    Aug. 23, 2012

Related U.S. Application Data

(60) Provisional application No. 61/445,775, filed on Feb. 23, 2011.

(51) Int. Cl.
*G06Q 40/00* (2012.01)

(52) U.S. Cl.
USPC .............. 705/39; 705/44; 705/64; 235/379; 235/380

(58) Field of Classification Search
USPC ................... 705/39, 44, 64; 235/379, 380
See application file for complete search history.

(56) References Cited

U.S. PATENT DOCUMENTS

| | | | |
|---|---|---|---|
| 5,646,998 A | 7/1997 | Stambler | |
| 5,677,955 A | 10/1997 | Doggett et al. | |
| 5,848,400 A | 12/1998 | Chang | |
| 5,861,841 A | 1/1999 | Gildea et al. | |
| 5,974,148 A | 10/1999 | Stambler | |
| 6,189,785 B1 | 2/2001 | Lowery | |
| 6,317,745 B1 | 11/2001 | Thomas et al. | |
| 6,327,577 B1 | 12/2001 | Garrison et al. | |
| 6,330,544 B1 | 12/2001 | Walker et al. | |
| 6,560,581 B1 | 5/2003 | Fox et al. | |
| 6,609,113 B1 | 8/2003 | O'Leary et al. | |
| 6,636,833 B1 | 10/2003 | Flitcroft et al. | |
| 6,675,153 B1 | 1/2004 | Cook et al. | |
| 6,704,714 B1 | 3/2004 | O'Leary et al. | |
| 6,748,367 B1 | 6/2004 | Lee | |
| 6,859,795 B1 | 2/2005 | Zolotorev et al. | |
| 7,003,493 B2 | 2/2006 | Weichert et al. | |
| 7,004,382 B2 | 2/2006 | Sandru | |
| 7,047,416 B2 | 5/2006 | Wheeler et al. | |
| 7,092,916 B2 | 8/2006 | Diveley et al. | |
| 7,096,204 B1 | 8/2006 | Chen et al. | |
| 7,104,443 B1 | 9/2006 | Paul et al. | |
| 7,107,249 B2 | 9/2006 | Dively et al. | |
| 7,136,835 B1 | 11/2006 | Flitcroft et al. | |
| 7,158,955 B2 | 1/2007 | Diveley et al. | |
| 7,165,052 B2 | 1/2007 | Diveley et al. | |
| 7,172,112 B2 | 2/2007 | Bonalle et al. | |
| 7,177,848 B2 | 2/2007 | Hogan et al. | |

(Continued)

*Primary Examiner* — Sara C Hamilton
(74) *Attorney, Agent, or Firm* — Hoffmann & Baron, LLP

(57) ABSTRACT

A method and system for processing DDA payment transactions including generating a private virtual identifier, associating the private virtual identifier with a DDA, and generating a public virtual identifier associated with the private virtual identifier. The method can also include distributing the public virtual identifier to consumers, receiving a DDA payment request from a billing entity including the public virtual identifier, retrieving the private virtual identifier in response to receipt of the public virtual identifier, and processing the DDA payment request using the private virtual identifier to facilitate payment to the billing entity on behalf of the consumer. The method and system also authenticates the identity of a user during a transaction.

11 Claims, 15 Drawing Sheets

(56) References Cited

U.S. PATENT DOCUMENTS

| | | |
|---|---|---|
| 7,209,889 B1 | 4/2007 | Whitfield |
| 7,240,031 B1 | 7/2007 | Kight et al. |
| 7,249,097 B2 | 7/2007 | Hutchison et al. |
| 7,251,656 B2 | 7/2007 | Keown et al. |
| 7,279,919 B2 | 10/2007 | Volkerink et al. |
| 7,383,223 B1 | 6/2008 | Dilip et al. |
| 7,412,422 B2 | 8/2008 | Shiloh |
| 7,433,845 B1 | 10/2008 | Flitcroft et al. |
| 7,543,738 B1 | 6/2009 | Saunders et al. |
| 7,567,934 B2 | 7/2009 | Flitcroft et al. |
| 7,571,141 B2 | 8/2009 | Huang et al. |
| 7,571,142 B1 | 8/2009 | Flitcroft et al. |
| 7,580,857 B2 | 8/2009 | VanFleet et al. |
| 7,593,896 B1 | 9/2009 | Flitcroft et al. |
| 7,644,042 B2 | 1/2010 | Ramavarjula et al. |
| 7,650,314 B1 | 1/2010 | Saunders |
| 7,676,431 B2 | 3/2010 | O'Leary et al. |
| 7,702,916 B2 | 4/2010 | Seaton, Jr. et al. |
| 7,711,616 B2 | 5/2010 | Knapp |
| 7,716,128 B2 | 5/2010 | Diveley et al. |
| 7,720,764 B2 | 5/2010 | Emerson et al. |
| 7,729,984 B1 | 6/2010 | Nappi |
| 7,734,542 B2 | 6/2010 | Bain |
| 7,748,614 B2 | 7/2010 | Brown |
| 7,752,132 B2 | 7/2010 | Stewart et al. |
| 7,761,385 B2 | 7/2010 | Hutchison et al. |
| 7,783,566 B2 | 8/2010 | Armes et al. |
| 7,783,578 B2 | 8/2010 | Mann, III et al. |
| 7,801,829 B2 | 9/2010 | Gray et al. |
| 7,827,101 B2 | 11/2010 | Mascavage, III |
| 7,827,108 B2 | 11/2010 | Perlman et al. |
| 7,831,490 B2 | 11/2010 | Modigliani et al. |
| 7,835,960 B2 | 11/2010 | Breck et al. |
| 7,835,994 B1 | 11/2010 | Hopkins, III |
| 7,844,546 B2 | 11/2010 | Fleishman et al. |
| 7,848,972 B1 | 12/2010 | Sharma |
| 7,849,014 B2 | 12/2010 | Erikson |
| 7,853,523 B2 | 12/2010 | Krueger et al. |
| 7,860,769 B2 | 12/2010 | Benson |
| 7,861,077 B1 | 12/2010 | Gallagher, III |
| 7,873,543 B2 | 1/2011 | Perrier et al. |
| 7,873,573 B2 | 1/2011 | Realini |
| 7,873,579 B2 | 1/2011 | Hobson et al. |
| 7,890,393 B2 | 2/2011 | Talbert et al. |
| 7,890,425 B2 | 2/2011 | Stanley |
| 7,890,433 B2 | 2/2011 | Singhal |
| 7,895,122 B2 | 2/2011 | Flitcroft et al. |
| 7,899,712 B2 | 3/2011 | May et al. |
| 7,899,755 B2 | 3/2011 | Whitfield |
| 7,908,226 B2 | 3/2011 | Hutchison et al. |
| 7,909,237 B2 | 3/2011 | Tredeau et al. |
| 7,917,444 B1 | 3/2011 | Bursch |
| 7,941,367 B2 | 5/2011 | Bishop et al. |
| 7,941,372 B2 | 5/2011 | Bishop et al. |
| 7,945,511 B2 | 5/2011 | O'Brien et al. |
| 7,953,671 B2 | 5/2011 | Bishop et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,962,409 B2 | 6/2011 | O'Leary et al. |
| 7,970,673 B2 | 6/2011 | Epple et al. |
| 7,970,677 B1 | 6/2011 | Oakes, III et al. |
| 7,979,348 B2 | 7/2011 | Thomas et al. |
| 8,271,395 B2 | 9/2012 | Dominguez et al. |
| 2001/0034702 A1 | 10/2001 | Mockett et al. |
| 2003/0018567 A1 | 1/2003 | Flitcroft et al. |
| 2003/0028481 A1 | 2/2003 | Flitcroft et al. |
| 2004/0128243 A1 | 7/2004 | Kavanagh et al. |
| 2006/0249567 A1 | 11/2006 | Byrne et al. |
| 2007/0198411 A1 | 8/2007 | Kavanagh et al. |
| 2007/0255662 A1 | 11/2007 | Tumminaro |
| 2007/0276736 A1 | 11/2007 | Guilfoyle |
| 2008/0120238 A1 | 5/2008 | Flitcroft et al. |
| 2009/0012897 A1 | 1/2009 | Flitcroft et al. |
| 2009/0037333 A1 | 2/2009 | Flitcroft et al. |
| 2009/0070260 A1 | 3/2009 | Flitcroft et al. |
| 2009/0134217 A1 | 5/2009 | Flitcroft et al. |
| 2010/0017328 A1 | 1/2010 | Stephen et al. |
| 2010/0257612 A1 | 10/2010 | McGuire et al. |
| 2011/0010292 A1 | 1/2011 | Giordano et al. |

# DEMAND DEPOSIT ACCOUNT PAYMENT SYSTEM

The virtual vault may be used to conduct various financial transaction including purchases, refunds, and balance inquiries using a payment system. The virtual vault can securely store cardholder information such as primary account number ("PAN") (real and public virtual account identifier and private virtual account identifier), expiration date (real and associated for vault), DDA data, UCAF ("Universal Cardholder Authentication Field") data (static for vault), vault account ID, password, and security questions/answers. The UCAF is a field in the authorization and clearing messages used to hold information to authenticate the transaction above and beyond the PAN, expiration date, CHIP, PIN and CVC fields.

FIELD OF INVENTION

The present invention relates to a system and method of conducting secure financial transactions, and more particularly a system and method for providing virtual identifiers in place of financial account numbers to provide secure transactions.

BACKGROUND

Automated Clearing House (ACH) transactions provide fund transfers between financial institutions that allow consumers to pay billing entities, such as merchants and/or service providers using the consumer's demand deposit account (DDA), such as a savings or checking account, maintained by a financial institution without requiring the consumer to write a check or use a debit card. To facilitate payment, the consumer provides DDA routing information associated with the DDA from which funds are to be withdrawn. DDA routing information is typically found in the magnetic ink character recognition (MICR) number at the bottom of paper checks. The MICR number generally includes a bank routing number and a bank account number. Anyone who has the DDA routing number and account number of DDA can access to the funds in the DDA. There are generally no restrictions that would prevent a fraudulent and/or unauthorized ACH transaction from occurring because verification and authentication are typically not performed and it is not until the consumer reviews his DDA statement that the fraudulent or unauthorized ACH transaction is detected.

ACH transactions are processed as bulk file transfers of information from a billing entity to the billing entity's commercial bank. The billing entity's commercial bank presents a hold list to the retail bank that maintains the consumer's DDA. The hold list can include the routing number, account number, and amount of funds to be withdrawn. The retail bank withdraws the funds from the DDA associated with the DDA routing information and transfers the withdrawn funds to commercial bank. There is typically no guarantee that funds will be available in the DDA when the billing entity enters an ACH transaction and there is typically no guarantee that the ACH transaction will not be rejected by the consumer forcing the billing entity to reverse the transfer of funds and return the funds to the consumer's DDA at the retail bank.

While there are several disadvantages to ACH transactions, ACH transactions are typically inexpensive compared to paper check transactions, credit card transactions, and debit card transaction. The cost of an ACH transaction can be any where from a couple of pennies up to 25 cents and consists of operation, management, risk, and fraud costs absorbed by the billing entity, acquirer, commercial bank, and/or the retail bank. ACH transactions are relatively inexpensive in part because the parties of the transaction generally do not collect a fee for providing an ACH transaction service. Instead, only the operational cost of handling of the bulk file request from the billing entity and the cost of transferring the money may be covered.

Retail banks are under increasing pressure to monetize their DDA assets at the same time that permissible solutions are under regulatory and consumer advocacy scrutiny. Recent changes in the Federal Regulation E and proposed rules under the Durbin Amendment are likely to draw significant revenues from the DDA environment in the next 12-24 months. Merchants are using what they perceive to be low cost Automated Clearing House (ACH) to complete transactions. But the actual cost—and the broader value proposition—does not effectively compete against potential solutions.

Accordingly, it would be desirable to provide a system and method of completing DDA transactions which is both cost effective and secure.

SUMMARY

In one aspect, a method for processing DDA payment transactions is disclosed. In another aspect a non-transitory computer readable medium storing instructions that when executed by a processing device cause the processing device to perform the method. The method can include generating a private virtual identifier, associating the private virtual identifier with a DDA, and generating a public virtual identifier associated with the private virtual identifier. The method can also include distributing the public virtual identifier to consumers, receiving a DDA payment request from a billing entity including the public virtual identifier, retrieving the private virtual identifier in response to receipt of the public virtual identifier, and processing the DDA payment request using the private virtual identifier to facilitate payment to the billing entity on behalf of the consumer.

In one aspect, a method for processing DDA payment transactions is disclosed. In another aspect a non-transitory computer readable medium storing instructions that when executed by a processing device cause the processing device to perform the method. The method can include generating a private virtual identifier and associating the private virtual identifier with a with a financial account identifier used for transferring funds to pay a billing entity. The method can also include generating with a processing device a public virtual identifier corresponding to the private virtual identifier and storing the private virtual identifier and public virtual identifier in a database of a payment network, the payment network communicating with a billing entity using the public virtual identifier to receive a request for payment, and the payment network communicating with a financial institution using the private virtual identifier to obtain funds from the financial institution to settle a payment with the billing entity on behalf of a consumer.

In other aspects, a system for processing DDA payment transactions is disclosed. The system can include computer storage database to store associations between DDA information, a private virtual identifier, and/or a public virtual identifier. The system can also include a transaction processing device configured to generate the private virtual identifier and/or the public virtual identifier and associate the private virtual identifier with a DDA and/or the public virtual identifier. The transaction processing device can also be configured to distribute the public virtual identifier to consumers and receive a payment request from a billing entity. The payment request can include the DDA routing and account number and/or the public virtual identifier. The transaction processing device can be configured to retrieve the private virtual identifier corresponding to the DDA routing and account information and/or the public virtual identifier and process the payment request using the private virtual identifier to facilitate payment to the billing entity on behalf of the consumer.

In another aspect a method for conducting a payment transaction is disclosed. The method includes:

storing at least one payment account in a secure database;

providing a consumer access to the secure database upon entry for a user unique credential;

permitting a consumer to make a payment from the stored payment account;

generating a private virtual identifier associated with the payment account;

generating a public virtual identifier associated with the private virtual identifier;

providing access to the secure database by the consumer through a computer network of a third party billing entity;

providing the public virtual identifier to the billing entity;

receiving payment request from a billing entity including the public virtual identifier;

retrieving the private virtual identifier in response to receipt of the public virtual identifier; and processing the payment request using the private virtual identifier to facilitate payment to the billing entity on behalf of the consumer.

In another aspect a system for processing payment transactions is disclosed. The system includes a virtual vault including a transaction processing device of a payment network and a secure database for storing payment account information and consumer identification information. The virtual vault is accessible by a consumer upon entry of one or more security credentials. The transaction processing device generates a private virtual identifier associated with the payment account information and generating a public virtual identifier associated with the private virtual identifier. The transaction serving is in operative communication with the database. A billing entity processing device is in operative communication with the transaction processing device. The billing entity processing device permits a consumer to pay using the public virtual identifier. The billing entity processing device transmits the public virtual identifier to the transaction server. The transaction processing device associates the public virtual identifier with the private virtual identifier. The transaction server communicates the private virtual identifier to a financial institution to facilitate payment from the payment account to the billing entity.

In a further aspect a method of authenticating the identity of a user over a computer network is disclosed. The method including:

providing an application on a computer network of a financial institution for a user to enter a plurality of identifying verifying information during a user registration;

providing the user with a security credential unique to the user;

communicating the user identifying information and security credential to a payment network and storing the credential and user identifying information in a database of the payment network;

operably connecting a third party computer network requiring verification of the user's identity to the payment network;

providing a user interface on the third party computer network for a user to enter the unique credential in order to gain access to information stored by the third party;

communicating the unique credential to the payment network;

comparing the credential to the database to determine if the credential matches the user; and generating a message to the third party which is responsive to the credential matching the user to permit access by the user to information retained by the third party.

DETAILED DESCRIPTION OF THE PREFERRED EMBODIMENTS

Figure 1:
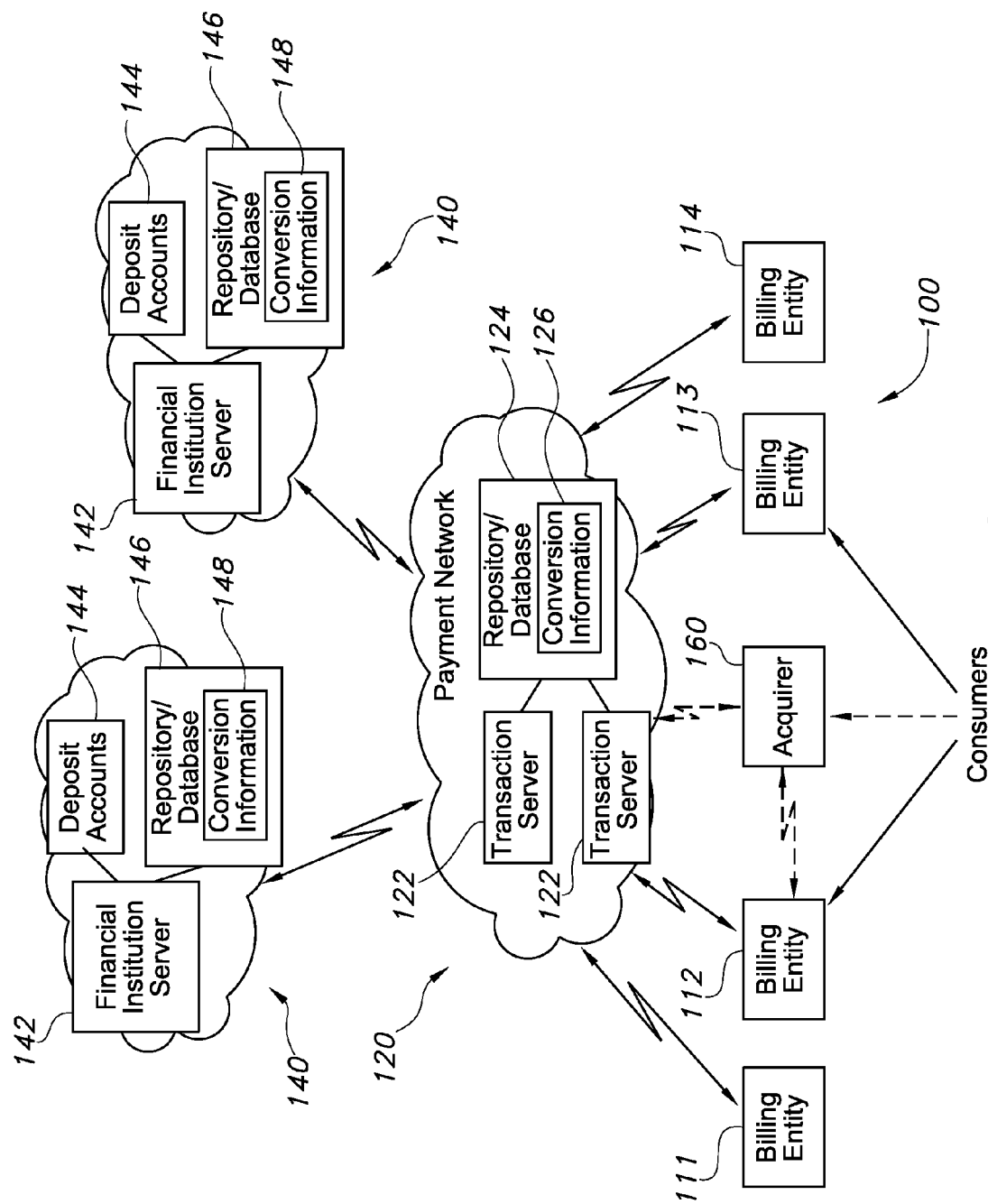
FIG. 1 depicts an exemplary payment system of the present invention.

FIG. 1 is an exemplary payment system 100 (hereinafter "system 100") that includes billing entities 111-114, a payment network 120, and financial institution networks 140. Consumers can have demand deposit accounts, such as demand deposit accounts 144 including checking accounts and/or saving accounts, with one or more of the financial institutions associated with the financial institution networks 140. A demand deposit account is a type of an account in which an account holder's funds are held and from which the account holder can withdraw funds on demand. The accounts can be managed and maintained by processing devices such as servers 142 of the financial institution networks 140.

As used herein the term "retail banks" refers to financial institutions (banks, credit unions, savings and loans, etc.) that manage a demand deposit account relationship with a consumer.

As used herein the term "billing entity" refers to one or more of the following: Wallet Providers: payment service providers that allow a consumer to place a payment account and enablement information in trust, making it possible for the consumer to make a payment without further exposing the private payment account information. Some entities are already in production, others have expressed a desire to pursue this role. Examples include entities like PayPal®, Amazon® Payments, Bling Nation®, ISIS, etc.

Billers: Billing entities that on a recurring basis present to consumers a bill for services rendered. Examples include entities like phone companies, utility companies, insurance companies, property rental firms, etc.

One-time Merchants: Billing entities that sell goods or services to consumers without necessarily having an expectation of previous or later transactions taking place. These merchants may be either e-commerce, MoTo, of Physical world merchants.

As used herein the term "payment system" refers to a collection of retail banks, billers, wallets, and one-time merchants that exchange payment transaction data using a payment network for the purpose of enabling payment between a consumer and the product/service provider.

As used herein the term "Automated Clearing House (ACH) Transaction" transactions can be batch processed transactions passed between banks that allow the movement of funds on a consumer's behalf The system 100 can facilitate payment transactions for billing entities to receive payment from consumers for goods and/or services purchased by the consumer. For example, a consumer can give account information to a billing entity to purchase goods and/or services from the billing entity and the billing entity can submit the account information and a request for payment to the payment network 120 to receive payment for the goods and/or services from a consumer's account maintained by the financial institution. In some embodiments, an acquirer 160, such as PayPal®, can be an intermediary between the billing entities 111-114 and the payment network 120. For example, billing entity 112 can use acquirer 160 to complete some, all, or none of the payment transactions for the billing entity 112. In some embodiments, the consumer can have a wallet account with the acquirer 160 such that the acquirer can store information associated with the consumer's account maintained by a financial institution. In these embodiments, the acquirer 160 can use the account information to request payment for the billing entity via the payment network 120.

The payment network 120 can include processing device, such as transaction servers 122, and a database 124. The transaction servers 122 are electronic devices in the payment network 120 for routing, verifying, managing, and the like, payment requests from the billing entities 111-114 and/or acquirer 160. The transaction servers 122 are communicatively coupled to the database 124, the billing entities 111-114, the acquirer 160, and the financial institution networks 140 to process payment requests. The transaction servers 122 are configured to route the payment requests through the payment network 120 and ultimately to the appropriate one of the financial institution networks 140. The transaction servers 122 can use information included in the payment request to determine how a payment request should be routed.

The transaction servers 122 can be used to implement a demand deposit account (DDA) payment service via the payment network 120. The DDA payment service can allow payment transaction to be implemented so that billing entities 111-114 can withdraw funds directly from consumer's DDA accounts maintained by financial institutions. The transaction server 122 can verify the availability of funds in a DDA account, by communicating over the payment network 120 to the financial institution network 140, before a DDA payment request is implemented using the DDA payment service to guarantee that the billing entities will receive the requested funds. For example, the transaction server may send a request for payment from the billing entity to the financial institution associated to the user selected payment account and then generate a message to the billing entity denying payment if the selected payment account does not have sufficient funds for the requested payment. In some embodiments, the payment network 120 can receive an ACH transaction from one of the billing entities 111-114 and can convert the ACH transaction into a DDA payment transaction. Unlike ACH transactions, in which funds are transferred directly between banks as long as the correct routing number and account number are provided, the DDA payment transaction by a verified and authorized withdrawal of money.

The sub-network is generated based on agreements between the financial institution networks 140 and the payment network 120, between the payment network 120 and the billing entities 111-114, and/or between the payment network 120 and the acquirer 160. For example, in the present example, billing entities 112-114 are registered for the DDA payment service, whereas the billing entity 111 is not registered for the DDA service. Likewise, in the present example, the acquirer 160 is registered for the DDA payment service. While the billing entity 111 has not registered with the DDA payment service, the billing entity 111 can still interface with the payment network 120 to facilitate other transactions, such as debit and/or credit card transactions. In this manner, each of the billing entities 111-114 can interface with the payment network, but only the billing entities 112-114 are included in the sub-network implemented by the payment network 120 for the DDA payment service.

The formation of the sub-network allows the payment system to control transaction using the DDA payment service. For example, the transaction server 122 can be configured to reject DDA payment transaction requests from the billing entity 111 since the billing entity 111 has not registered for the DDA payment service. In some embodiments, the transaction server can implement transaction rules, which may be specified by the payment network or the consumer, to limit and/or restrict DDA payment transactions. For example, the consumer can specify that DDA payment requests from the billing entity 114 should not be processed by the transaction server 122, place a maximum dollar amount of DDA payment transactions, authorize recurring DDA payment transactions only if the dollar amounts of the transactions remain the same, and the like. Therefore, if the billing entity 114 transmits a DDA payment request to the transaction server 122, the transaction server 122, can deny or block the transaction if it is not in agreement with the rules. Additionally, or alternatively, the transaction server 122 can send messages to the consumer to alert the consumer to DDA payment transactions being processed and can allow the user to confirm whether the transaction should proceed.

The transaction servers 122 can be configured to generate virtual identifiers associated with DDA's maintained by one or more of the financial institution networks 140. For example, in some embodiment, one of the financial institution networks can agree to use the DDA payment service and can provide a list of DDA's to the transaction server 122, which can generate a private virtual identifier for the DDA's so that each DDA in the list have a corresponding private identifier. As another example, in some embodiments, the financial institution networks can request a quantity of private virtual identifiers from the transaction server and the transaction server 122 can generate and transmit the private virtual identifiers to the financial institution network, which can associate the private virtual identifiers with DDA accounts maintained by the financial institution network. In some embodiments, the transaction server can generate a public virtual identifier for one or more of the private virtual identifiers. The public virtual identifiers can be transmitted to consumers corresponding to the DDA's account associated with the public virtual identifiers. In one embodiment the private virtual identifier can be the DDA account number or other financial account identifier, such as a credit card PAN, itself The transaction servers 122 can store the associations between the private virtual identifiers, public virtual identifiers, and DDA account information in the database 124 as conversion information 126. The conversion information can be included in a look-up table accessible by the transaction server to retrieve the private virtual identifiers based on the public virtual identifiers and/or the DDA account information. For example, in some embodiments, the billing entities 112 and 113, and the acquirer 160 can transmit a DDA routing and account number to the payment network. The transaction server 112 can retrieve the public virtual identifier and provide it to the billing entity. The billing entity can then make a payment request over the payment network using the public virtual identifier. The payment network may then convert the public virtual identifier to the private virtual identifier and transmit the payment request to the appropriate financial institution network 140 based on the private virtual identifier.

The financial institution networks 140 can include one or more servers 142 to receive and process the payment requests routed to them from the payment network 120, and to generate payment responses to the payment requests in accordance with rules and/or other predetermined parameters established by the financial institutions associated with the financial institution networks 140. The financial institution networks 140 can also includes a database 144 that stores conversion information 146, such as an association between DDA's, the private virtual identifier, and/or the public virtual identifier. Upon receipt of a DDA payment request from the transaction server 122 of the payment network, the servers 142 of the financial institution networks 142 can retrieve DDA information associated with the private virtual identifier included in the request using the conversion information 146 in the database 144.

The financial institution networks 140 can determine whether to process or deny/block the payment requests received from the payment network 120. If the transaction is denied, a payment response corresponding to the denial is transmitted to the billing entity via the payment network 120. If the transaction request is accepted, a payment response corresponding to the acceptance is transmitted to the billing entity via the payment network 120. If the transaction request is approved, the financial institution can withdraw funds from the demand deposit account associated with the request and transfer the funds an account associated with the billing entity.

The DDA payment requests can be implemented as a single or dual message transaction. In a single message transaction, authorization and settlement are performed together. In a dual message transaction, authorization is performed as a first step and settlement is performed as a second step. In either case, the DDA payment service implemented using the payment network can quickly, securely, and reliably authorize, clear, settle, and move data related to a DDA payment transaction. Using the DDA payment service can allow financial institutions that manage DDA's to monetize transactions typically performed as ACH transactions, while simultaneously reducing operational costs incurred by billing entities and acquirers resulting from operation, management, risk, and fraud associated with ACH transactions.

Figure 2:
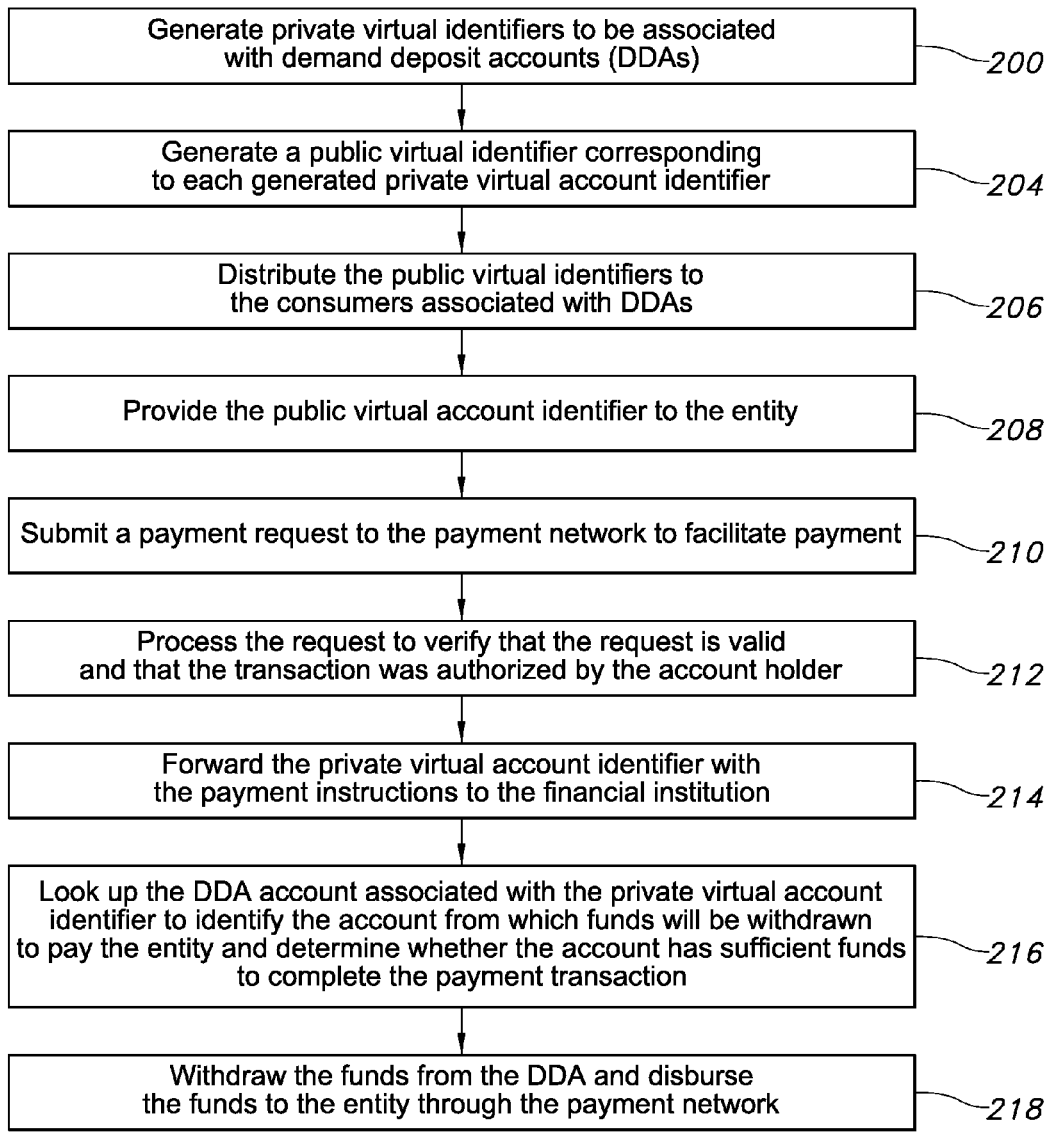
FIG. 2 depicts a flowchart illustrating an exemplary process for performing demand deposit account transactions.

FIG. 2 is a flowchart illustrating an exemplary process for performing demand deposit account transactions. To begin, a transaction server of the payment network generates private virtual identifiers to be associated with demand deposit accounts (DDA's) of a financial institution (200). As one example, the transaction server can receive a list of DDA's from a financial institution and can generate a private virtual identifier for each DDA in the list so that each DDA in the list has a corresponding private virtual identifier. As another example, the transaction server can receive a request to generate a quantity of private virtual identifiers. The transaction server can generate and transmit the generated requested quantity of private virtual identifiers to the financial institution network. The financial institution can associate the private virtual identifiers generated by the transaction server with DDA's maintained by the financial institution so that the DDA's have a corresponding private virtual identifier.

The private virtual identifiers can be a string of glyphs including numbers, letters, symbols, and the like. In some embodiments, the private virtual identifiers can be an arbitrary sixteen (16) digit number. Transmission of the private virtual identifiers can be limited so that the private virtual identifier is only transmitted between the financial institution maintaining the DDA associated with the private virtual identifier and the payment network. In this manner, the private virtual identifiers are not provided to the consumer or other entities so that the consumer and other entities do not know the private virtual identifier. Furthermore, the private virtual identifier does not function in the physical world. That is, it cannot be used by a billing entity or acquirer to gain access to a consumer's DDA and a transaction card (e.g., a debit card) cannot be generated using the private virtual identifier.

The transaction server can also generate a public virtual identifier corresponding to each generated private virtual account identifier (204). The public virtual account identifiers are distributed to the consumers associated with the demand deposit accounts (i.e., account holders) (206). The public virtual identifiers can be a string of glyphs including numbers, letters, symbols, and the like. In some embodiments, the public virtual identifiers can be an arbitrary sixteen (16) digit number. The public virtual identifier can be used by a consumer to facilitate payment for purchases made by the consumer. In this manner, the virtual identifiers are provided to the consumer or other entities so that the consumer and other entities may know the public virtual identifier. The public virtual identifier is different from the private virtual identifier.

The public virtual identifier does not function in the physical world. That is, a transaction card (e.g., a debit card) cannot be generated using the private virtual identifier. The public virtual identifier can be used to purchase goods and/or services by allowing a billing entity to withdraw funds directly from the consumer's DDA for a one time transaction or on a reoccurring basis. The public virtual identifier can be stored by a billing entity and/or acquirer so that the billing entity and/or acquirer can use the public virtual identifier in the future.

When the account holder, e.g., consumer, wishes to enter a demand deposit account payment transaction, the account holder can provide the public virtual identifier to the billing entity with payment instructions and a personal identification number (PIN) (208) and the billing entity can submit a payment request including the public virtual identifier with the payment instructions to the payment network to facilitate payment (210). Upon receipt of the payment request by the payment network, the transaction server can process the request to verify that the request is valid, the DDA account associated with the payment request has sufficient funds, and that the transaction was authorized by the account holder (212). To process the transaction, the transaction server converts the public virtual identifier to the private virtual identifier corresponding to the public virtual identifier. For example, the transaction server can look up the private virtual identifier in a look-up table using the public virtual identifier. The transaction server also determines whether a valid PIN was provided based on a stored PIN value associated with the public virtual identifier.

Once the transaction server has retrieved the private virtual identifier, the transaction server can forward the private virtual identifier with the payment instructions to the financial institution (214). The financial institution can look up the DDA account associated with the private virtual identifier to identify the account from which funds will be withdrawn to pay the entity (216). Upon identifying the corresponding DDA, the financial institution can withdraw the funds from the DDA and disburse the funds to the entity through the payment network (218).

Figure 3:
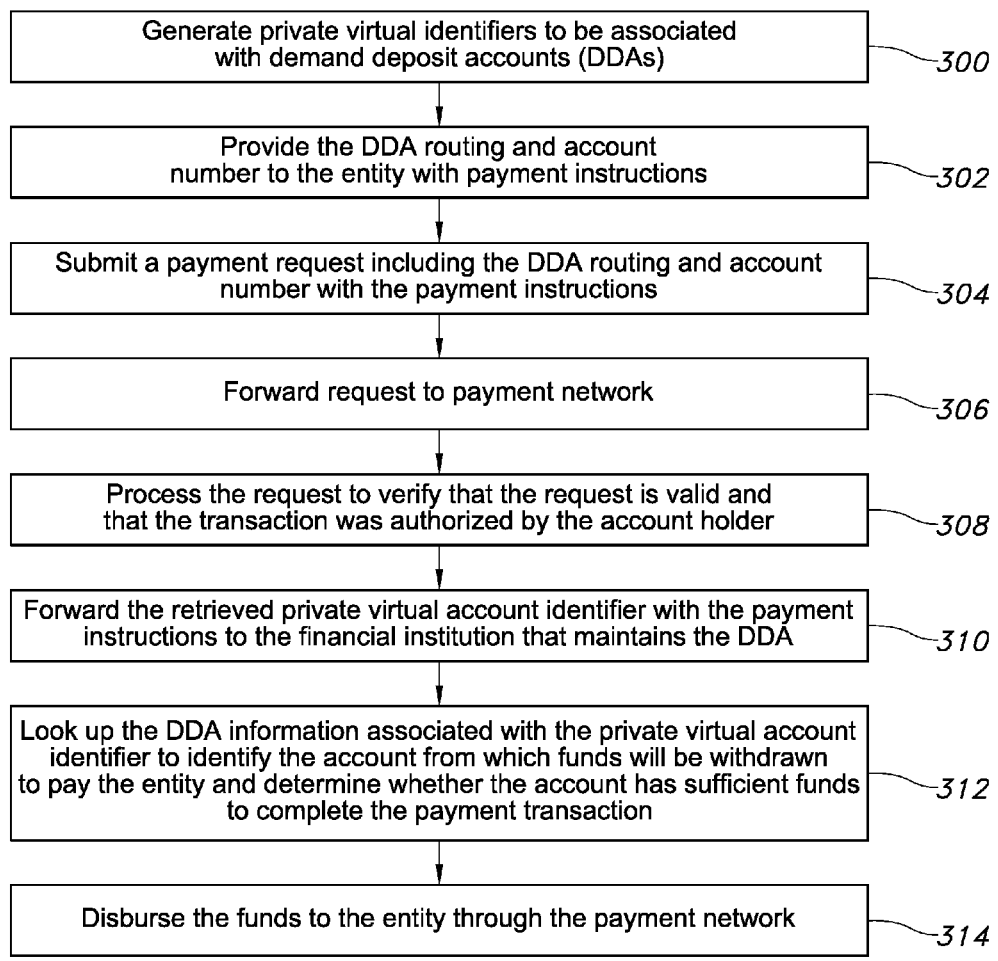
FIG. 3 depicts a flowchart illustrating another exemplary process for demand deposit account transactions.

FIG. 3 is a flowchart illustrating another exemplary process for demand deposit account transactions. To begin, a transaction server of the payment network generates private virtual identifiers to be associated with demand deposit accounts (DDA's) of a financial institution (300). As one example, the transaction server can receive a list of DDA's from a financial institution and can generate a private virtual identifier for each DDA in the list so that each DDA in the list has a corresponding private virtual identifier. As another example, the transaction server can receive a request to generate a quantity of private virtual identifiers. The transaction server can generate and transmit the generated requested quantity of private virtual identifiers to the financial institution network. The financial institution can associate the private virtual identifiers generated by the transaction server with DDA's maintained by the financial institution so that the DDA's have a corresponding private virtual identifier.

The private virtual identifiers can be a string of glyphs including numbers, letters, symbols, and the like. In some embodiments, the private virtual identifiers can be an arbitrary sixteen (16) digit number. Transmission of the private virtual identifiers can be limited so that the private virtual identifier is only transmitted between the financial institution maintaining the DDA associated with the private virtual identifier and the payment network. In this manner, the virtual identifiers are not provided to the consumer or other entities so that the consumer and other entities do not know the private virtual identifier. Furthermore, the private virtual identifier does not function in the physical world. That is, it cannot be used by a billing entity or acquirer to gain access to a consumer's DDA and a transaction card (e.g., a debit card) cannot be generated using the private virtual identifier.

When the account holder wishes to enter a transaction, the account holder can provide the DDA routing and account number to the entity with payment instructions (302) and the entity can submit a payment request including the DDA routing and account number with the payment instructions to the payment network to facilitate payment (304). Up to this point, the transaction appears to be an ACH transaction, but rather than submitting the request through the entities bank, the request is forwarded to the payment network (306). Upon receipt of the payment request by the payment network, the transaction server can process the request to verify that the request is valid, the DDA account associated with the payment request has sufficient funds, and that the transaction was authorized by the account holder (308). In order to determine if sufficient funds exist, the transaction server would send a message to the financial institution associated with the account. The financial institution would send a message to the payment network confirming or denying the sufficiency of the funds. To process the transaction, the transaction server converts the ACH-based transaction request to a DDA payment service request by retrieving the private virtual identifier corresponding to the DDA routing and account number. For example, the transaction server can look up the private virtual identifier in a look-up table using the DDA routing and account number.

The transaction server can forward the retrieved private virtual account identifier with the payment instructions to the financial institution that maintains the DDA (310) and the server of the financial institution can look up the DDA information associated with the private virtual account identifier to identify the account from which funds will be withdrawn to pay the entity (312). Upon authorization of a withdrawal from the DDA, the financial institution can immediately disburse the funds to the entity through the payment network (314).

Using the above approach, identity theft and DDA takeovers can be reduced and/or mitigated because the DDA account information is no longer used to effectuate payment, and therefore, is not generally available. For example, a hacker that hacks into a billing entities database will no longer find DDA account information, but rather will find the public virtual identifiers, which are indirectly linked to the DDA's. Since the public virtual identifiers cannot be turned into a financial transaction without routing through an application or service of the payment network, the ability for misuse or appropriation of a consumer's DDA account is diminished. Additionally, the above approach will lower the PCI compliance requirements for participating billing entities.

Billing entities seeking to use the demand deposit account payment service provided by the sub-network within payment network can register for the service. Thus, for a billing entity to avail itself of the DDA payment service, the billing entity enters into a DDA payment service agreement. The agreement can include rules and restrictions for using the DDA payment service, which can be implemented by the transaction servers of the payment network. Since only billing entities that register for the service can avail themselves of the DDA payment service, the number of places the DDA payment transaction can take place is restricted and the transaction can be monitored separately from other transactions occurring on via the payment network.

Figure 4:
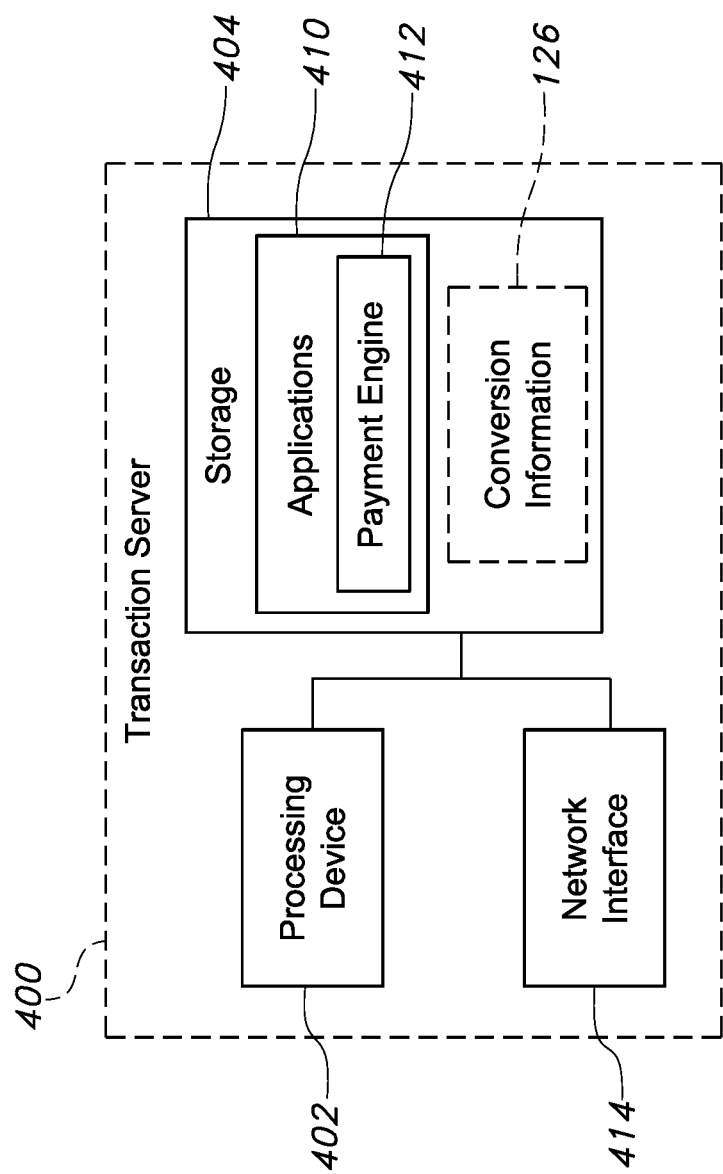
FIG. 4 depicts an exemplary block diagram of a transaction server.

FIG. 4 is an exemplary block diagram of a transaction server 400, which can be implemented in the system 100 as one or more of the transaction servers 122 (FIG. 1). The transaction server 400 can be a computing device configured to transfer and route information based on account information. In the illustrated embodiment, the transaction server 400 includes one or more controllers or processors 402 (hereinafter "processing device 402"), such as central processing unit (CPU), and storage 404 for storing data, such as account information, routing parameters and/or tables, and instructions, such as instructions for facilitating processing of payment requests and payment responses. For example, storage 404 can store conversion information 126. The storage 404 can include non-transitory computer readable medium technologies, such as a floppy drive, hard drive, tape drive, Flash drive, optical drive, read only memory (ROM), random access memory (RAM), and the like.

Applications 410, such as a payment engine 412, for facilitating processing and routing of transaction requests and transaction responses between the billing entities and the financial institution networks, can be resident in the storage 404. The applications 410 can include instructions that can be implemented using, for example, C, C++, Java, JavaScript, Basic, Perl, Python, assembly language, machine code, and the like. The transaction server 200 includes a network interface 214 for communicating with other components of the payment network, such as other transaction servers, as well as with the billing entities and the financial institution networks. The processing device 402 operates to execute instructions included in the payment engine 410 to facilitate operation of the transaction server to facilitate the DDA payment service processes as described herein.

In situations where a billing entity has been using the ACH system to obtain funds from a customer, the present invention can be employed to convert the ACH transaction to those offered by the payment network. The billing entity would, either directly or through a bank intermediary submit the DDA number to the payment network and would receive a public virtual identifier. This conversion may be facilitated by the retail bank. For future billing event, the billing entity would process the payment request through the payment network using the public virtual identifier.

This approach has many tangible benefits. The billing entity can take advantage of the payment network and the retail banks' in-place ability to quickly, securely, and reliably authorize, clear, settle, and move data related to a payment transaction. The retail bank can safely and securely monetize the DDA asset they maintain on behalf of the consumer. In addition, the billing entity, commercial banks, and retail bank can take advantage of the payment networks value-added services.

In one embodiment the payment provider facilitates the introduction, conversion, and maintenance of a separate public virtual account identifier which the consumer provides to the market instead of their confidential DDA routing numbers. The retail banks distribute the public virtual account identifier to their consumers. These identification numbers do not directly tie to any account and must be converted by the payment network to generate a financial transaction. When a consumer is asked by a billing entity such as wallet, merchant, etc. for their DDA information the consumer would provide the asking entity the public virtual account identifier rather than the confidential DDA routing information. Billing entities that wish to be paid from a consumer's DDA would submit the appropriate transaction details along with the consumer's public virtual account identifier to the payment network. The payment network then converts the public virtual account identifier to the private virtual account identifier. The appropriate account number would then be provided to their retail bank through existing card payment channels. The resulting transaction authorization, clearing, settlement and supplemental data movement—either single message or dual message—would be handled in accordance with the established contracts and agreements.

This approach has many benefits even beyond those previously described. The consumer's private information is not shared outside of the retail bank/payment system domain, significantly reducing the potential of fraud and theft. Billing entities have less confidential consumer financial information that they must maintain, secure, etc.

In operation, participating financial institutions, such as retail banks, would provide the payment network a table that matches DDA numbers and debit card PANs. All debit cards would be listed in the tables. A wallet would present to the payment network, on a transaction by transaction basis, a transaction with an associated DDA. The payment network, using the bank provided table, would convert the DDA into the correct PAN and forward the transaction to the retail bank for single message handling. The payment network would settle between the wallet and the retail bank, and collect fees from one or both parties depending upon the deal construct.

The present invention may also allow for physical checks to be converted for processing over a payment network. A bank may receive paper checks from a large merchant and process them on their behalf. In stead of processing them through the ACH system, the check account and rerouting information can be converted to a public virtual identifier. The payment can then proceed through a payment network.

By processing the payment through the payment network additional benefits can be achieved. Transaction risk monitoring and scoring for retail and commercial banks and their customers can be performed. Unlike ACH, DDA Service transactions can take advantage of existing and new risk scoring models that examine and judge transactions before funding is requested. In addition, consumer-focused mobile based transaction validation (SMS/App "Did You Make This Transaction?) may take place. A separate non-financial transaction. Depending upon what the merchant is willing to pay a retail bank could assure the merchant that (a) the consumer's account was open, (b) the account had good funds available, (c) the account had a positive payment history, etc. Furthermore, consumer managed Recurring Payment controls (support Reg E requirements) can be put in place. Federal regulations require that a consumer can stop a recurring bill payment with the equivalent ease of stopping a paper check. In the ACH environment this can be difficult since the merchant initiates the transaction, the transactions arrive at the retail bank in batch, and the dollar value of the transaction can be different from occurrence to occurrence. Card payment infrastructure has already enable the ability for recurring payments on cards to be blocked and this infrastructure can be extended to DDA Services.

The use of the payment network also permits retail bank-focused relationship rewards aggregation. Because the payment network's infrastructure would potentially see nearly all transactions hitting a consumer's DDA (debit card-signature, debit card-PIN, ATM, ACH, checks converted) the ability to provide issuers a platform to reward consumers for their transaction behavior would increase significantly.

The payment network also permits general consumer identity theft monitoring services (credit+debit+ACH transactions aggregated allowing pan-portfolio transaction method monitoring). In addition, controls that are typical for credit cards can be set up for the DDA accounts. Controls may include spending limits time limits, etc.

In addition to securely permitting DDA payments to be processed through a payment network using a public virtual account identifier and a secure private virtual account identifier, the present invention provides a secure platform where DDA accounts and other payment accounts can be maintained. The payment network provider may establish and administer a system for consumers to maintain all their payment devices such as DDA, credit cards, debit cards, etc in one secure password protected database referred to herein as a virtual vault, or vault. Payments may be made from the virtual vault platform as a secured payment account based alternative to ACH transactions or a substitute for direct card based payment methods. The virtual vault which is accessible provides a secure means to store billing entity, bank, and customer data, and build the relationships between each entity. These relationships will provide a secure means to store payment information by the billing entity to be used as an efficient payment mechanism by the consumer. In setting up a virtual vault, a consumer's identify is verified. Therefore, in transaction using the vault the billing entity can be certain that the party making the payment is authorized to due so. Such verification is very important to the party seeking payment.

The vault may include a processing device associated with the payment network and also include a database in which confidential payment information and identity information of a consumer may be stored. The vault may include the following:

Database for storing information related to:
Consumers,
Billing entities,
Issuers,
Relationships between Consumers and Billing Entities
Servers (Hardware/Software) to provide following functionality:
Validate the parties when accessing the vault
Associate the parties together creating the unique payment information to be used by the billing entity for the Consumer
When payment is made, validates the unique payment information is valid for the consumer/biller combination and converts to the payment information known to the bank
User interfaces (web pages) to
Manage the information about the parties The vault integrates with the payment networks payment transaction servers and permit for payments to billing entities to be made through the vault to be processed in a manner similar to clearing credit card transactions.

A payment service is created that links banks, the billing entity, and consumers for the purposes of replacing ACH with secure payment account based capabilities. The service includes having consumers register their payment account from their own online banking site, and identify the billing entity they want to be associated with. The payment network provides the billing entity with unique customer payment information to be used for purchase transactions. When a consumer makes a purchase using a billing entity, the payment network will validate the payment information provided by the billing entity, and translate it into the "true" payment information to be provided to the issuer.

The virtual vault may be used to conduct various financial transaction including purchases, refunds, and balance inquiries using a payment system. The virtual vault can securely store cardholder information such as primary account number (real and public virtual account identifier and private virtual account identifier), expiration date (real and associated for vault), DDA data, UCAF ("Universal Cardholder Authentication Field") data (static for vault), vault account ID, password, and security questions/answers. The UCAF is a field in the authorization and clearing messages used to hold information to authenticate the transaction above and beyond the PAN, expiration date, CHIP, PIN and CVC fields.

The virtual vault may be associated with more than one billing entity, payment data provided to the biller wallet. The virtual vault permits the same public virtual account identifier to be sent to all billing entity's associated to an account. A unique (per billing entity) vault expiration date can be generated based upon vault terms input by the consumer. A unique (per billing entity) vault UCAF field can be generated by the vault.

The vault includes a database which securely stores data such as vault ID and biller id that represent relationships and id's between consumers and the billing entity. The vault can maintain a list of those online banks that have successfully registered, and their security and registration data. The vault can also maintain a list of those billing entities that have successfully registered. The vault also maintains active account relationships across consumers and billing entities, and provides the ability to link and display all of a consumer's accounts under a unique id.

The set up and registration of the virtual vault may be accomplished by the issuing bank, the billing entity or the consumer. When the vault is set up by the issuing bank the following steps may be followed:

1. An issuing bank registers with the payment network in order to be eligible to offer the vault product to its customers. The payment network operates and administers the vault. Registration may entail the issuing banks computer network operably connecting with the payment network's computing system. Registration information can be exchanged.
2. The issuing bank may modify their online banking site to integrate with virtual vault. For example, the banking site may have a webpage dedicated to the virtual vault. A consumer may use this web page to interact with the vault. From a consumer's perspective the vault is offered by the issuing bank and the payment network, such as MasterCard, may also be identified.
3. The payment network provides access to the vault from an issuer's online banking site without an additional logon (i.e. single sign on). Accordingly, when a consumer logs on to their bank's website to access banking functions, they will also be gaining access to the virtual vault.
4. The issuer online banking site can be configured to display a list of participating billing entities. Such billing entities may have previously registered with the payment network.
5. The payment network may create a software application plug in that can be used by issuers to ease integration efforts.

Alternatively, the vault may also be set up by a billing entity using a processing device such as a server. In the case the following steps may be followed:

1. A billing entity using a processing device registers with the payment network before being eligible to participate.
2. The billing entity site displays a list of participating banks
3. Billing entity adds the virtual vault as a payment option.
4. Billing entity will allow users to activate their virtual vault account. This could be done by entering a user name and password.
5. The payment network creates a plug in that can be used by billing entity to ease integration efforts.

For example, if the biller is a utility such as a gas company, a consumer who chooses to pay a bill online may be given the choice to pay with a check, credit a card or the virtual vault. If the consumer has registered with their bank to participate in the virtual vault program, they could enter a username and password and make a payment from an account in the virtual vault.

When the vault is set up by the consumer themselves the following steps may be followed:

1. The consumer accesses the virtual vault registration and account management from the issuer online banking site over a computer network.
2. The virtual vault provides consumer screens with issuer branding for registration and account management.
3. The consumer may choose the funding source, e.g., one or more DDA's at a bank or credit accounts to be associated with their vault account.
4. A consumer may register accounts from more than one banking institution to be used by the vault, and associated with the same vault consumer account.

In each manner of creating the vault account, the consumer is a verified entity. The consumer will be verified by the issuing bank. Therefore, transactions using the account are highly secure.

Once a consumer vault account has been created, an association with a billing entity can be made to activate the account. The account could be activated the issuer's online banking site or from the billing entity site. Alternatively, the billing entities may be able to use a vault virtual account identifier in lieu of a DDA account with or without consumer consent. The virtual account identifier may be similar in configuration to a credit card PAN and may be referred to herein as a "virtual PAN" or "public virtual PAN".

In order to permit a transaction to take place each issuer will provide a public virtual identifier. Such identifier may be a public virtual PAN that will be given to billing entities to be submitted in messages. These public virtual identifiers may have the same characteristics as the real bin ranges they are representing. The private virtual identifiers are stored in the vault and will have a corresponding virtual vault PAN. The private virtual identifiers may be the actual real PAN or DDA numbers. The public virtual identifiers may be used by the billing entities in order to conduct a transaction. The private virtual identifiers are stored in the vault database and are only used between the payment network and the bank.

Billing entities/acquirers who use the vault may be connected to the payment network's single or dual message system. Issuers who use the vault may be connected to the payment network's single or dual message system. When payment network receives a vault transaction from an acquirer, the payment network will validate the public virtual identifier, expiration date, UCAF, and biller id provided in the message corresponds to the data stored in vault for the consumer/biller id relationship. When the payment network receives a vault transaction from an acquirer, the payment network will replace the public virtual identifier and expiration date with the "real" private virtual identifier information stored in the vault.

In a preferred embodiment, the payment network may establish a unique public virtual identifier or "virtual PAN" for billing entity—consumer relationship. For example, if the consumer establishes a vault relationship with the gas company, a virtual PAN will be created that can only be used for payment by that particular customer to that particular gas company. Therefore, each consumer billing entity relationship has a unique virtual PAN that is locked to a particular relationship. All of these unique virtual PAN correspond to a private virtual identifier which is used by the payment network and bank to transfer funds.

If one of the virtual locked PAN's is compromised, it does not affect the relationship with the other billing entities. Therefore, in order to remedy the situation, only the public virtual PAN that has been compromised needs to be replaced. The private virtual identifier does not need to change. This is in contrast to prior art situations in which a private virtual identifier such as an actual PAN is used for every merchant, billing entity transaction. If the actual PAN is compromised, all of the billing entities would have to be notified and a new PAN recorded. Furthermore the public virtual identifier that is locked to a particular relationship can not be used for transactions beyond the relationship. For example, if the virtual locked PAN is established for transactions between customer A and cable company B, the number would be useless if it were attempted to be used to purchase gas or electronics. Even if the payment network or consumer were unaware that the virtual locked PAN had been compromised, it could not be used outside of the relationship.

Furthermore, the system allows a consumer to deactivate a billing entity relationship such that the next transaction submitted from the billing entity is declined. This action may be desired if the billing entity consumer account data is compromised. Deactivation of the relationship allows one to shut down activities (i.e. deactivate accounts) by bank or billing entity. When the relationship is deactivated, one can update billing entity payment data information. If a virtual PAN has been compromised a new virtual PAN can be established and the relationship reactivated. The private virtual identifier does not need to change.

The relationship between a consumer and billing entity can be customized to set conditions on the relationship. If those conditions are violated, then the payment system will reject the transaction. For example, the consumer may set a maximum transaction amount (max per transaction or unlimited amount)—Need to store in cardholder billing currency. The consumer may set an expiration date (expiration date of consumer—billing entity relationship). The consumer may specify a single use condition such that the consumer/biller wallet relationship will only be active for one authorization transaction.

The present system permits a consumer to have multiple funding sources associated to a vault account and a consumer may associate multiple billing entities to each funding source. When a consumer and billing entity "relationship" is stored in the vault, the following information may be stored in the memory of the payment networks computer system:

DDA—may not be present if only a credit account.

Account information for all accounts DDA credit, etc. stored in the vault.

DDA PAN—this is the number provided by the issuer that is associated to the DDA, and used during transaction processing. This will not be present if only a credit account.

Other PANs—there may be multiple based upon the number of consumer accounts.

Virtual PANs—created by the payment network from a bin range provided by the issuer. Each PAN will have a corresponding unique virtual PAN. The same virtual PAN can be used across consumer and billing entity relationships.

Expiration Date—the real date associated with the card account. This will be unique for each card account, but will be the same in every consumer and billing entity relationship.

Vault Expiration Date—the date created by the vault based upon the vault terms specified by the consumer. This will be unique for each card account, and will be unique for every consumer and billing entity relationship.

Vault static UCAF—created by the vault—will be received from the merchant, validated, and dropped before sending to the issuer. This will be unique for each card account, and will be unique for every consumer and billing entity relationship.

Biller id—the payment network assigned id to identify the billing entity.

The vault ID and consumer password and other information used to authenticate the consumer.

The vault registration process may now be explained in more detail. In order for the vault to be established parties would register with the payment network which is administering the vault. The registration procedure may vary depending on the party. The issuer may initiate registration by submitting information to the payment network. The issuer may provide the information such as ICA, Bank Name, Routing and Transit Number, Participating bins (real and virtual), and Default Vault Terms. This information would be entered into the payment network's computer systems and can be extracted into a feed that will populate the vault database.

The billing entity registration will be initiated when the billing entity over a billing entity server or other processing device submits information to the payment network to be processed. The billing entity may provide its name and the registration is routed to and approved by entity managing the vault, i.e. the payment network. The billing entity may be assigned an identification number and the payment networks system is updated to include the billing entity as being associated with the vault.

Account registration may be initiated at the issuer online banking web site. During registration, the issuer provides user/customer payment information to the vault. Payment information includes such things as:
  Routing and Transit number for DDA
  private virtual identifier
  private virtual identifier expiration date
  Public virtual identifier This information may be provided in at least one of two ways. Option 1 involves the issuer online banking application, running on a bank processing device, communicating with a vault web service to "pre-register" the user payment information. The payment network vault service holds this data for reference during the user registration with the vault. Option 2 involves the issuer online banking application creating an encrypted XML message containing user payment information that is posted by the user during registration with the vault.

In a preferred embodiment, the user payment information listed above, and other user sensitive information such as the public virtual identifier and the private virtual identifier will be encrypted in the vault database using an approved data encryption algorithm. Additionally, the user will be required to create a user ID, password and security questions to satisfy FFIEC guidelines. The user will be required to fully authenticate with the vault (i.e. supply user ID, password, security questions) when entering via the billing entity site during billing entity activation. When entering via the Issuer Online banking site, the user will not be required to explicitly authenticate with the vault, since a single sign-on (SSO) capability from the issuer will be available. Billing entity activation and SSO will be described later in the document.

The user may be required to provide their email address as their user ID. This will provide a convenient option for the user and will allow the vault to link each account the user creates from each issuer online banking site.

Figure 5:
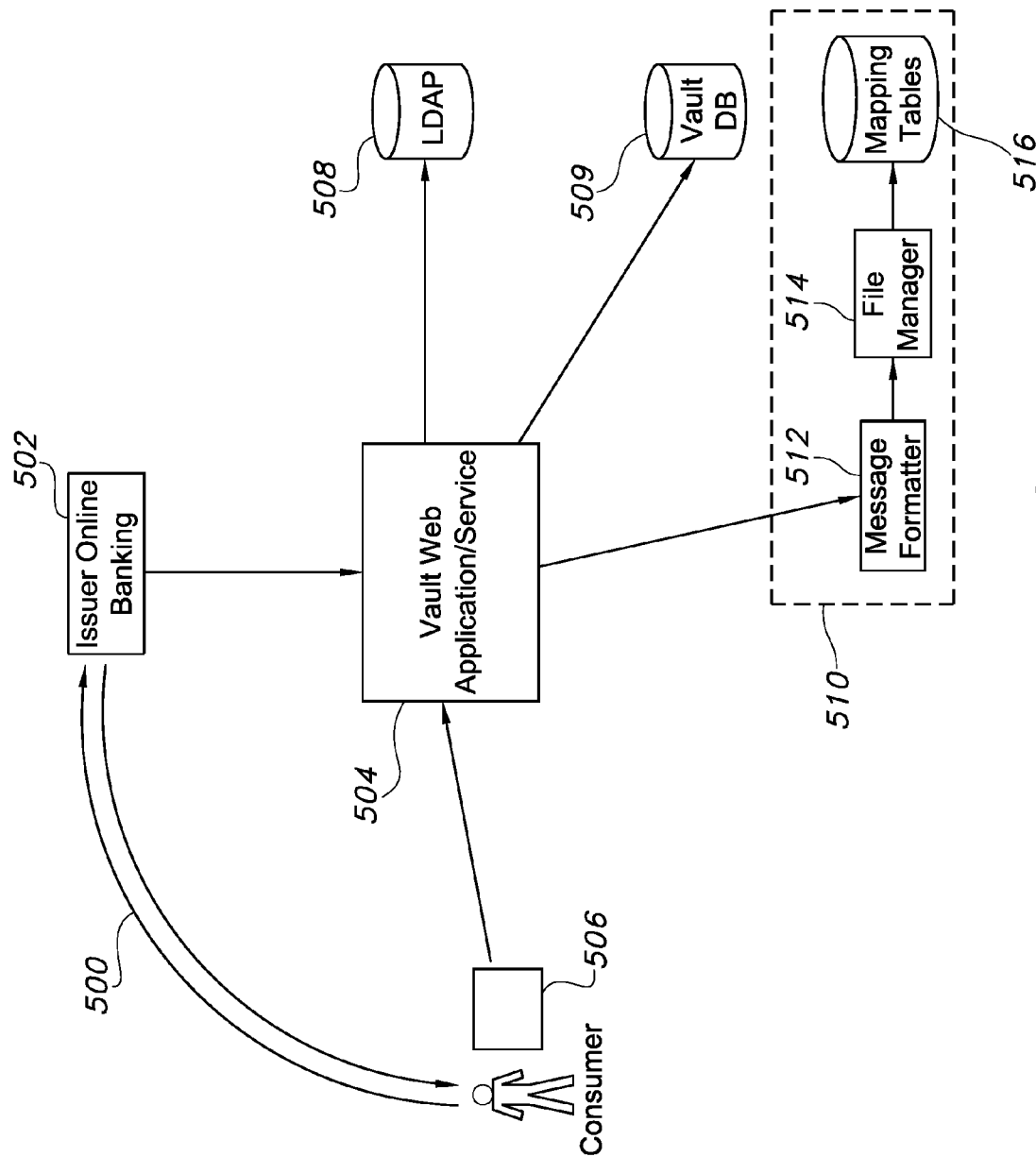
FIG. 5 depicts a system for registration of a user for a virtual vault.
Figure 6:
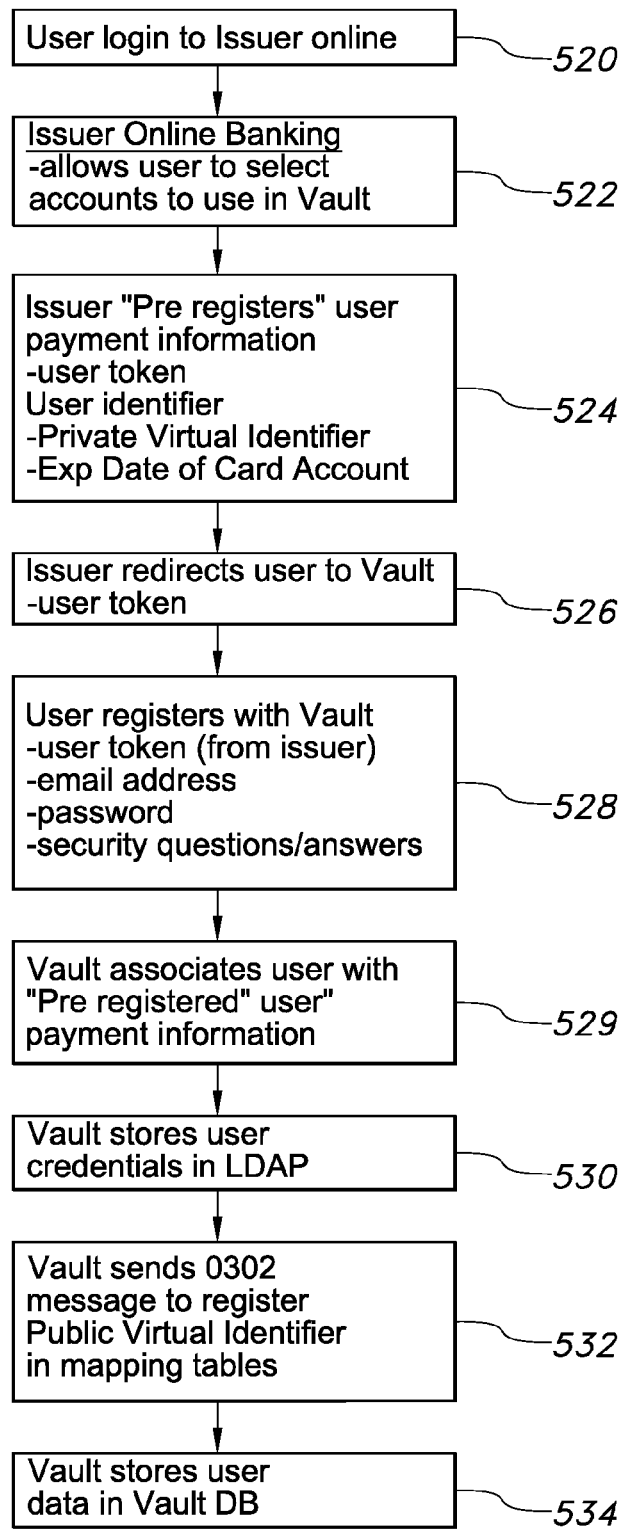
FIG. 6 depicts a flowchart detailing online pre-registration of a user for a virtual vault using the system of FIG. 5.

With reference to FIGS. 5 and 6, the system 500 may include an issuer online banking computer processing device such as server 502, operably connected to a vault web application/service 504 running on processing device which is associated with the payment network. The vault application 504 may be operably connected to a consumer interface 506 over the internet. The vault application 504 may also make use of a user security database such as the LDAP (Lightweight Directory Access Protocol) database 508. The LDAP may store the user's email address, consumer identifier, password and security questions and answers.

A vault database 509 is also operably connected to the vault web application 504. The vault database may contain the consumer's email, the public virtual identifier, DDA private virtual identifier and expiration dates, and spending limits associated with the accounts. Such information may be stored in an encrypted manner. The vault web application 504 may include, or be operably connected to, an account management system 510. The account management system may include a message formatter application 512 for converting a message into a payment request, and an account file manager application 514 for building mapping tables and mapping tables 516. The mapping tables store the conversion between the public virtual identifiers and private virtual identifiers.

In order to register with the vault a user, such as a consumer, logs into their online banking site using their bank user ID and password 520. The online bank site offers an option to use the vault product 522. The consumer selects the vault, and the online bank provides a list of consumer debit and credit accounts to be used with vault. When the consumer chooses an account to use with the vault, the online banking software application calls a vault web service and the online banking application provides the following information 524:
  Consumer Routing and Transit number if supporting ACH replacement,
  Card account number or private virtual identifier,
  Real expiration date of card account,
  A user "session" token,
  A user identifier (e.g. Distinguished Name) to be used for SSO.

The payment network using a processing device will create a public virtual identifier when the billing entity is associated with the consumer.

The Online Banking software application will then redirect the user to the vault website with the user "session" token 526. The user may then register with the vault, providing information such as the user "session" token, email address, password, and security questions/answers 528. The vault associates the information provided by the user to the "pre-registered" data via the user "session" token. User security credentials such as a user ID, and/or password, etc. are then stored in a user security database such as the LDAP (Lightweight Directory Access Protocol) database 530. The security credentials would be required to be entered by a user/consumer in order to directly access the vault and set up relationships with billing entities from accounts secured therein. The vault software application will register the public virtual identifier to private virtual identifier relationship in the mapping tables in the Account Management System 532. This information will be used during processing of the purchase authorization request. The vault software application may store the user payment information in the vault database 534.

Figure 7:
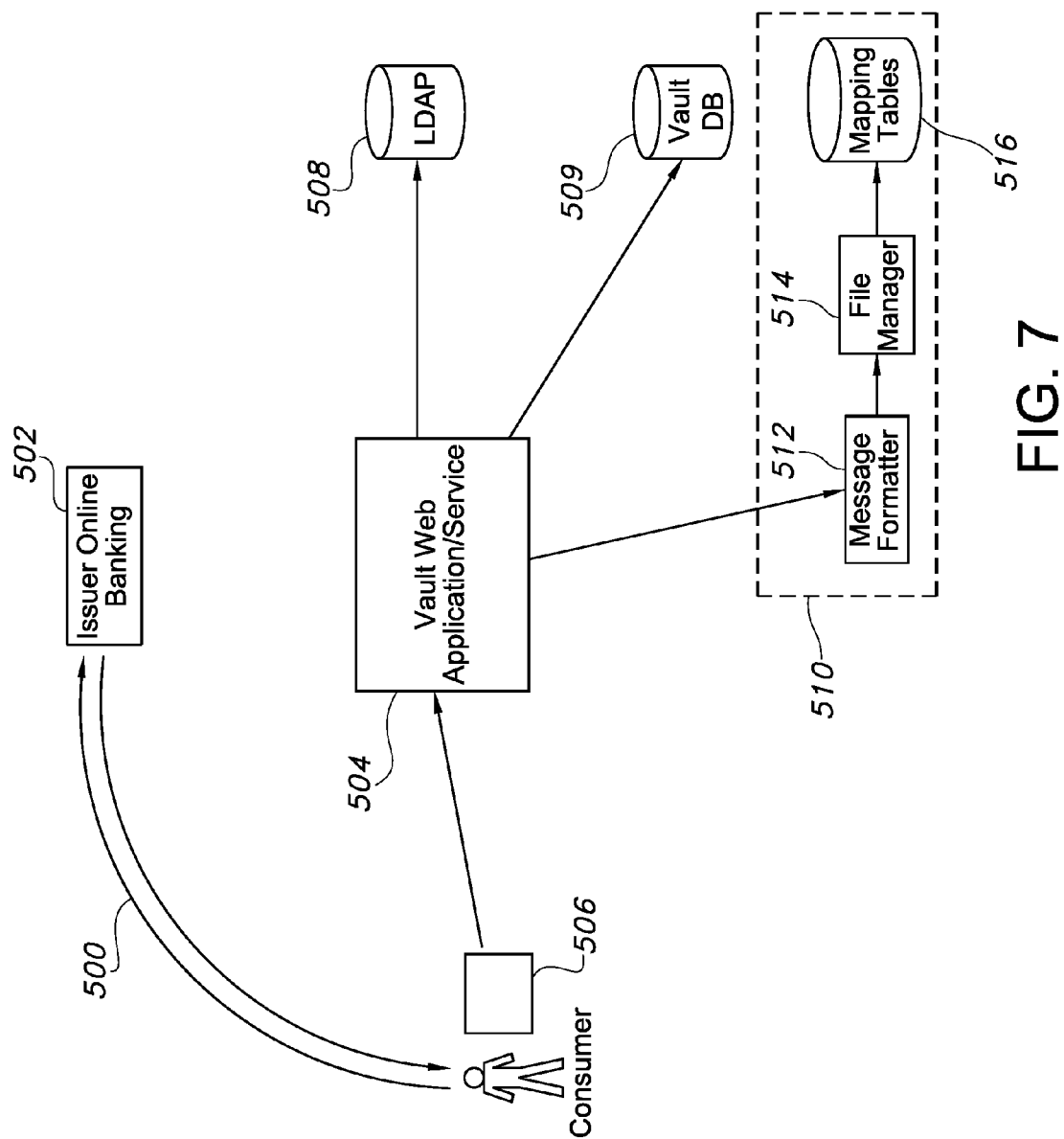
FIG. 7 depicts an alternative embodiment of a system for registration of a user for a virtual vault.
Figure 8:
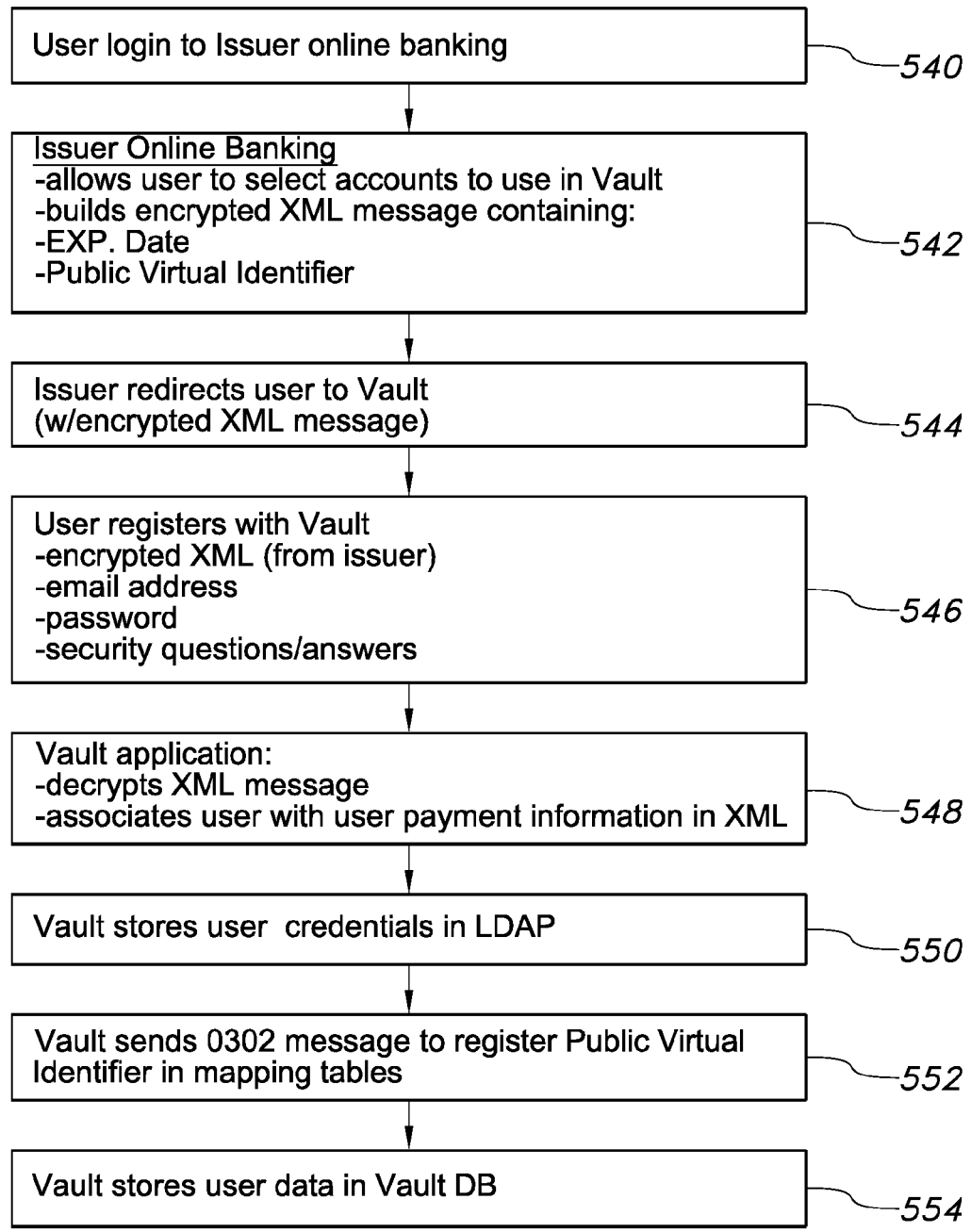
FIG. 8 depicts a flowchart detailing registration of a user for a virtual vault using the system of FIG. 7.

In an alternative embodiment shown in FIGS. 7 and 8, the user provides an encrypted XML message. In this embodiment, the system 500 is the same as that shown in FIG. 5, but the issuing bank 502 does not connect to the vault 504. In this embodiment, the consumer logs into their online banking site using their bank user id and password 540. The online bank site offers an option to use the vault product and the consumer selects the consumer debit and credit accounts to be used with vault 542. The online banking application then builds an encrypted XML message containing the following user payment information 544:
  Consumer Routing and Transit number if supporting ACH replacement,
  Card account number or private virtual identifier,
  Real expiration date of card account,
  A user identifier (e.g. Distinguished Name) to be used for SSO.

The payment network will create a public virtual identifier when the billing entity is associated with the consumer.

The Online Banking application redirects the user to the issuer branded vault website with the encrypted XML message 544. The user can then register with the vault by providing information such as email address, password, and security questions/answers 546. The vault will decrypt the XML message and associate the payment information to the user 548. User credentials (userID, password, etc.) can then be stored in the LDAP database 550. The vault application software can register the public virtual identifier to private virtual identifier relationship in PAN mapping tables in the account management system 552. This information will be used during processing of the purchase authorization request. The vault software application may store the user payment information in the vault database 554.

The vault can be activated by the billing entity. Billing entity activation provides the billing entity with the user's public virtual identifier for use during a purchase authorization request. The billing entity may store the user's public virtual identifier for subsequent transactions. During activation, the billing entity may request the user's public identifier from the vault. An authorization protocol may be used to process this request.

During the billing entity activation, the user will be presented with all the eligible vault accounts from all issuers, provided the user registered with the vault using the same email address during each issuer online banking vault registration.

Figure 9:
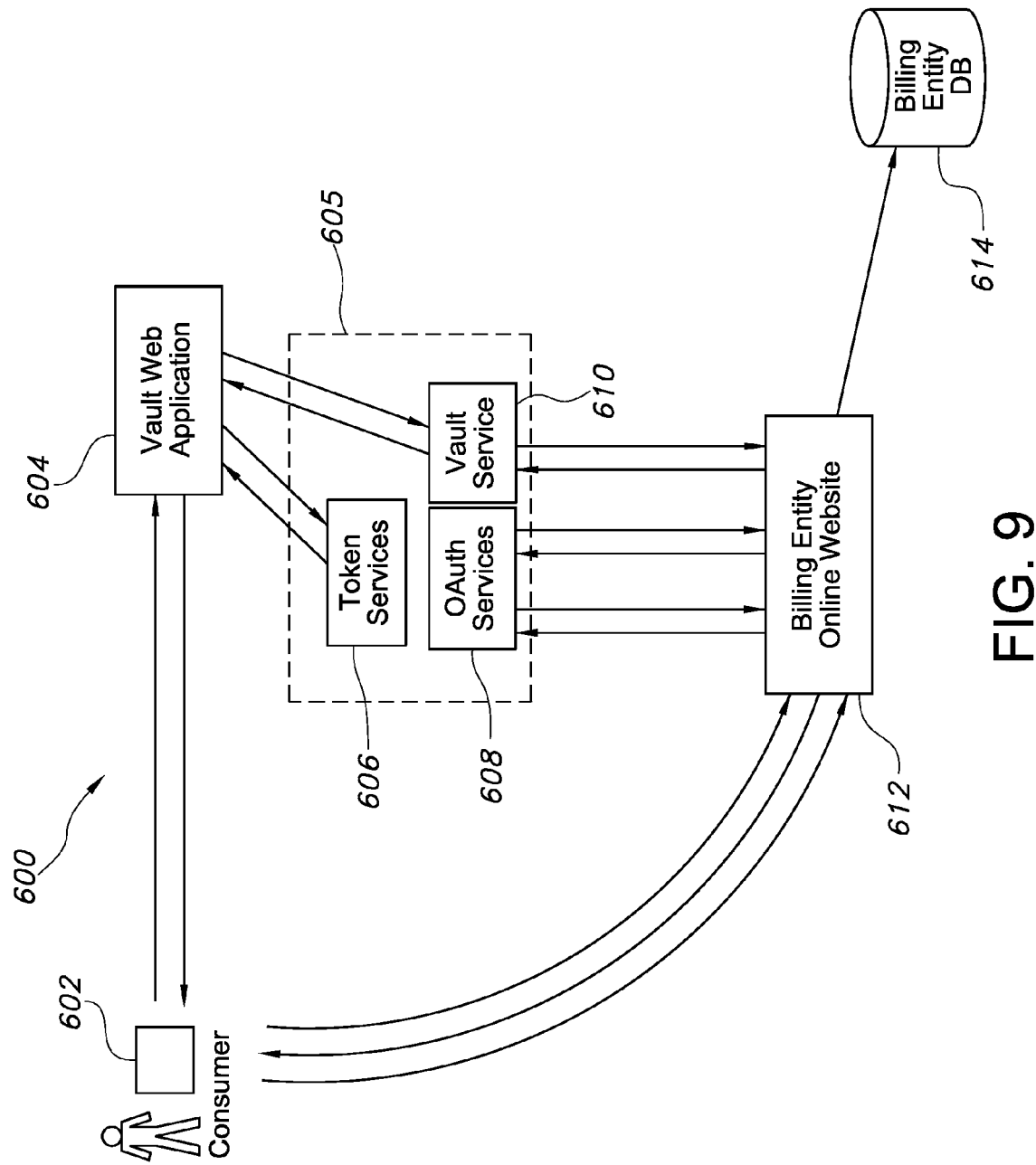
FIG. 9 depicts a system showing virtual vault activation by a billing entity.

With reference to FIG. 9, the billing entity activation will now be described in more detail. The system 600 may include a consumer input device 602 operably connected to a vault web application 604 which is operably connected to a payment system 605 of the payment network including token services 606, OAuth ("Open Authorization") Service 608 and vault service 610. The OAuth service is permits secure communication between the billing entity and payment network. The payment system 605 is operably connected to a billing entity online website 612 which is run by a billing entity processing device, such as server, which is operably connected to the consumer input device 602. The billing entity online website 612 is operable connected to a billing entity database 614. The billing entity online website 612 can provided a consumer with an option to activate the vault account. The billing entity database updates the database with vault data, such as the public virtual identifier, the relationship to the billing entity account ID, e.g., email address or a utility account number, for the consumer.

Figure 10:
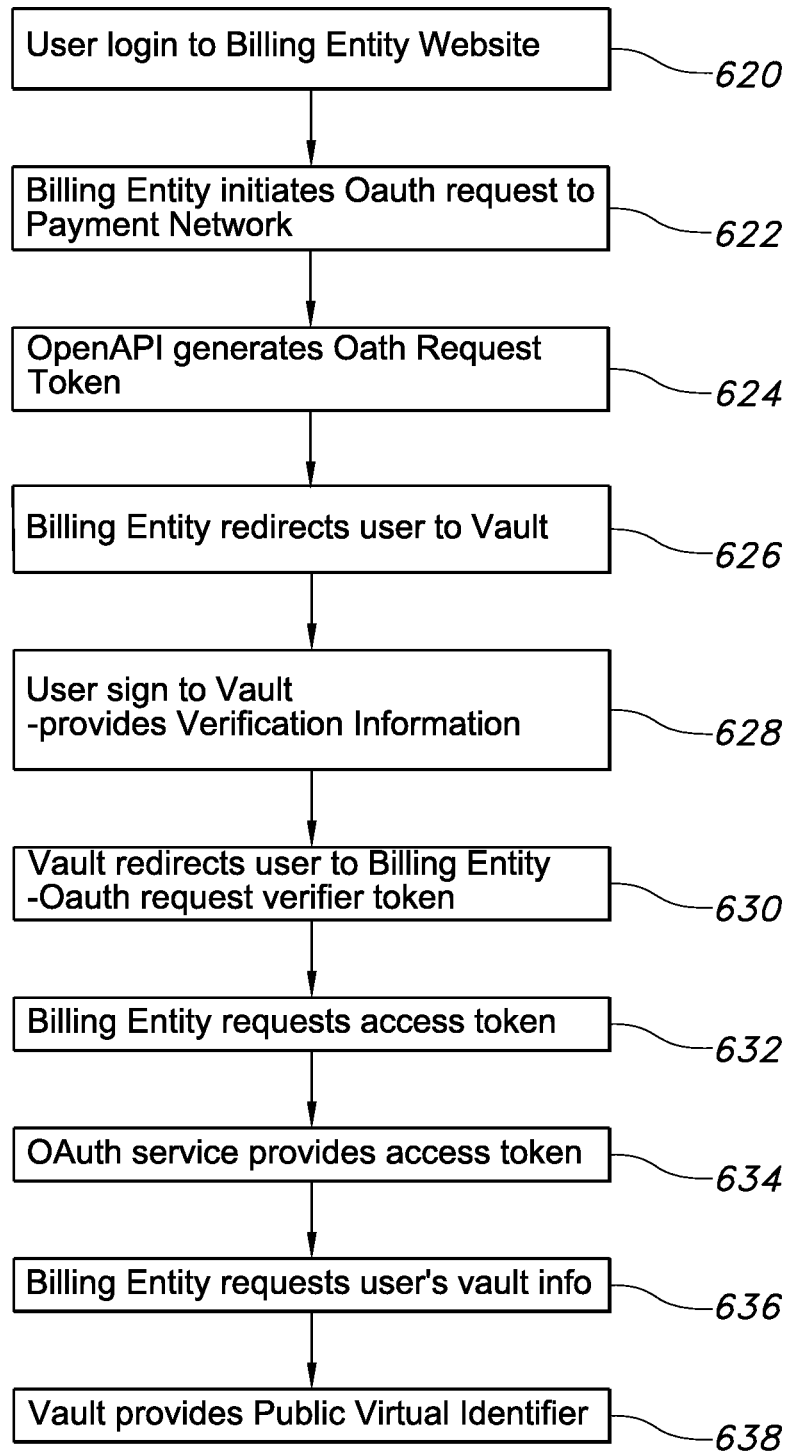
FIG. 10 depicts a flowchart detailing online pre-registration of a user for a virtual vault using the system of FIG. 9.

With reference to FIGS. 9 and 10, the consumer logs onto a billing entity site to activate their account with the billing entity 620. The billing entity initiates the OAuth request with the vault via the payment network OpenAPI OAuth implementation 622. OpenAPI generates OAuth request token 624. The billing entity then redirects the consumer to authenticate with the vault, providing the OAuth request token 626. The consumer is asked to identify themselves using their security credentials such as vault id, vault password and security information. The vault validates the information. The consumer then selects the funding source and term options such as number of days before deactivating, spending limit, etc, that will be applied to transactions coming from the billing entity 628. The vault 504 creates a relationship between the funding source and the billing entity and creates a public virtual identifier unique to the funding source and billing entity. This public virtual identifier is locked to the relationship and can only be used in transactions between that specific billing entity and consumer. The public virtual identifier may include the PAN, expiration date, and a combination of the CVC and UCAF.

Via the OAuth protocol, the consumer is redirected back to the Billing entity site with the appropriate OAuth request verifier token 630. The billing entity completes the OAuth request for the token to the vault 632. OAuth service provides the access token 634. The Billing entity requests payment information to be used in the authorization request from the OpenAPI vault service 636. Payment information provided to the billing entity may include the public virtual identifier 638.

Figure 11:
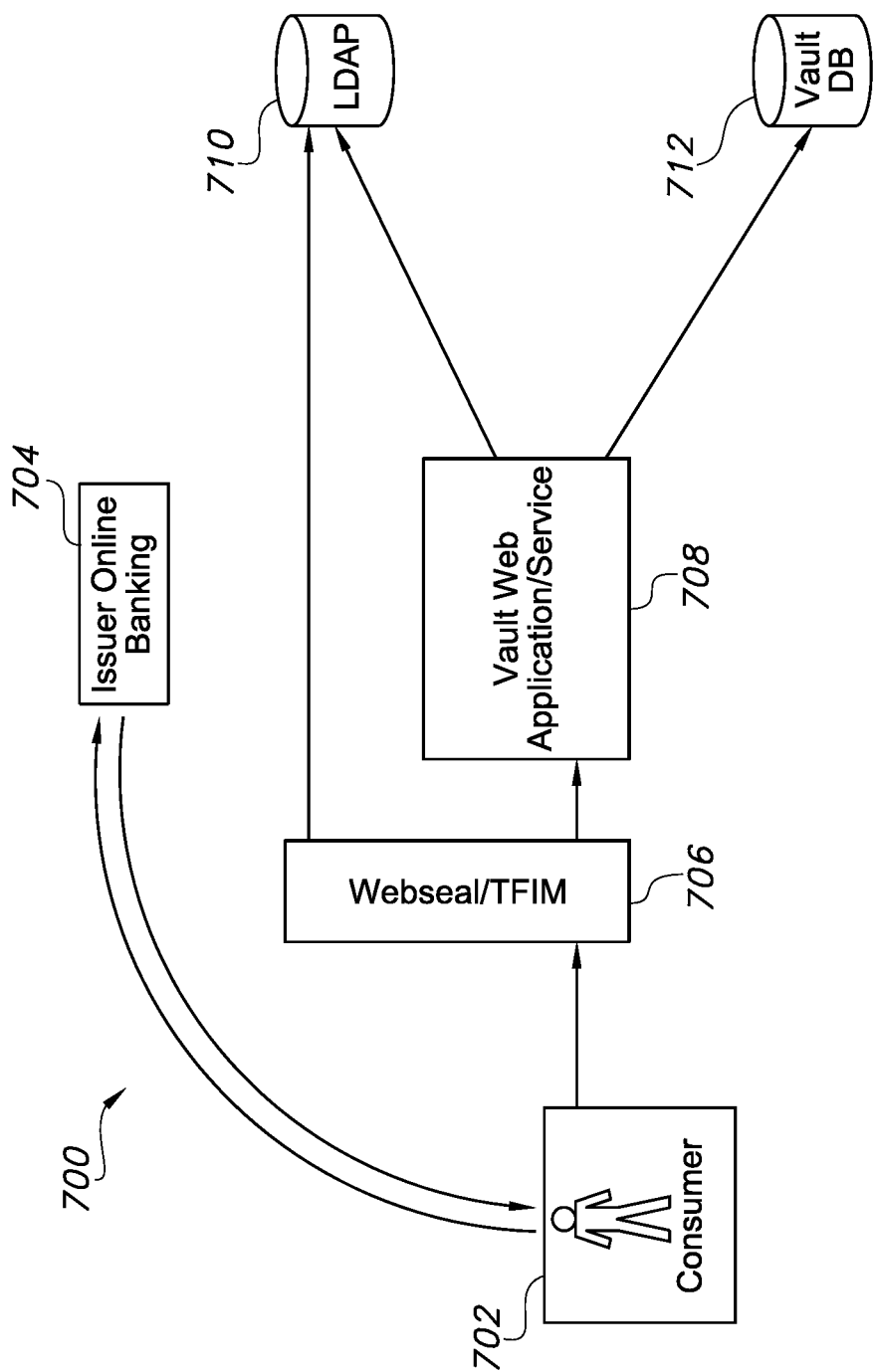
FIG. 11 depicts a system showing a single virtual vault sign-on from an issuer's online banking site.
Figure 12:
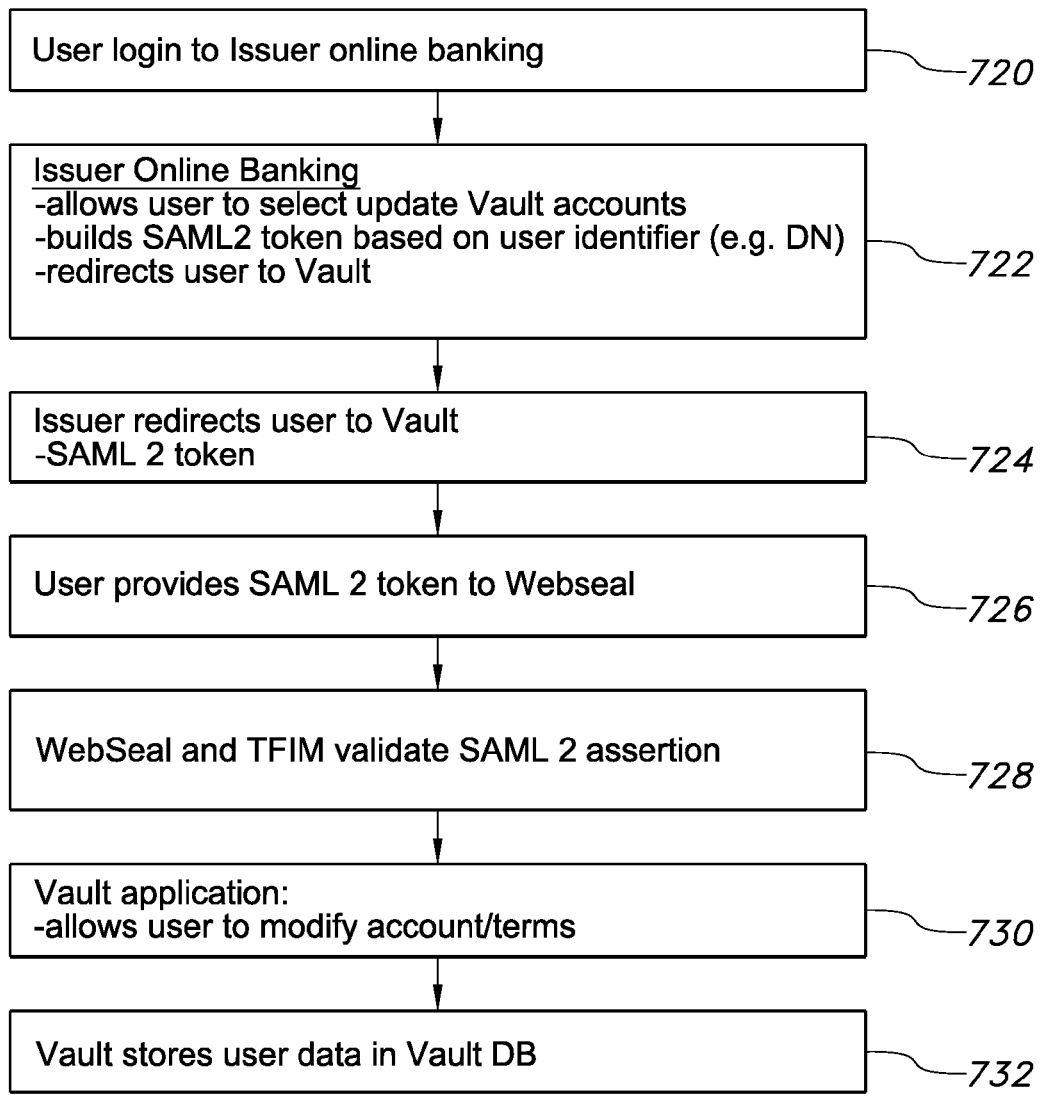
FIG. 12 depicts a block diagram detailing single virtual vault sign-on using the system of FIG. 11.

With reference to FIGS. 11 and 12, in order to facilitate a single sign on solution for consumers from the issuer online banking site, the vault will accept SAML 2.0 security assertions provided by the issuer. A user identifier established during registration will be provided in the SAML 2.0 token and will allow the vault to identify the user. In this system 700 shown in Figure F, the user input 702 is operably connected to the issuer online banking processing device such as server 704. The user is also operably connected to a Webseal/TFIM 706 which is operably connected to a processing device running a vault web application 708 and to a LDAP 710. Server 708 is operably connected to the LDAP 710 and to a vault database 712.

With reference to FIG. 12, the consumer logs on to the issuer online bank processing device such as a web server 720. The issuer allows a user to update vault accounts and builds a SAML2 token based on the consumer's identifier 722. The issuer can also redirect the consumer to the vault with the token 724. The consumer can then provide the token to the webseal 726. The webseal and TFIM validates the token 728. The vault allows the consumer to modify the account 730. The vault can then store the information in the vault database 732.

In addition to activation from the billing entity site, billing entities can be activated for use with the vault during account registration or account management from the issuer online banking site. Alternatively, billing entity activation from the issuer online banking site can be implemented via a direct link to the billing entity processing device and following the process for billing entity activation via the billing entity site.

A billing entity that has been processing payment through the ACH system can convert those DDA accounts in a batch process so that payment can be made through the vault and the payment network. In one option this batch conversion may be done without the need for the consumer's consent. This option may be achieved by the following steps:

1. The payment network provides a file of banks that participate in the vault (Bank routing number is key).
2. The vault receives a file of DDA's for conversion. The vault searches database to determine if DDA information is on file.
3. If a match is found, the vault creates and stores a billing entity and consumer "relationship". The vault uses default term options to create the data. At the time the relationship is built, the unique data is also built and stored in the vault.
4. The vault provides a file to the billing entity containing payment information for DDA's that were found:
   DDA
   Unique public virtual identifier, which may be in the form of a PAN
   Vault Expiration Date
   Vault static UCAF As an alternative to batch conversion described above, DDA conversion can be provided via an online web service, allowing the billing entity to request a public virtual identifier on an as-needed basis. The following steps may be employed for such conversion:

User selects an existing DDA account to use for payment at billing entity site.

The billing entity performs a look up against a database of participating Bank Routing Transit Numbers (RTN).

If the Bank participates, query the vault to determine if the DDA account number is registered to an existing vault user.

Upon matching of a DDA account, the vault will provide the user's payment information (public virtual identifier, B/W Expiration date and B/W UCAF) to the billing entity.

Billing entity via a processing device such as a server will submit the purchase authorization request using the user's payment information.

If the bank does not participate, or the user is not yet registered in vault, the billing entity will continue to use the DDA account for the purchase transaction.

In an alternative embodiment the batch conversion of DDA's to the vault system may be done with the consumer's consent by way of the following:

The payment network provides a file of banks that participate in vault (Bank routing number is key).

Billing entity asks the consumer, e.g. via a web site, if they would like to participate in vault. If so, the billing entity sends a request for DDA conversion to the vault.

The vault using a processing device searches the vault database to determine if DDA information is on file.

If a match is found, vault creates and stores a billing entity and consumer "relationship". The vault uses default term options to create the data. At the time the relationship is built, the unique data is also built and stored in vault.

If found, vault provides payment information:
DDA
Public virtual identifier
Vault Expiration Date
Vault static UCAF As an alternative to batch conversion, DDA conversion can be provided via an online web service, allowing the billing entity to request a public virtual identifier on an as-needed basis using the following steps:

User selects an existing DDA account to use for payment at Billing entity site. Billing entity includes a processing device that performs a look up against a database of participating Bank Routing Transit Numbers (RTN).

If the Bank participates, the billing entity queries the user if they participate in the vault.

If the user elects to use the vault, the billing entity processing device will query the vault processing device to determine if the DDA account number is registered to the user.

Upon matching of a DDA account, the billing entity will initiate the billing entity activation flow and use the user's payment information in the purchase authorization request.

If the DDA account is not registered in the vault, the billing entity will alert the user that their account is not registered with the vault and will use the DDA in the purchase transaction.

There may be times when a consumer/user may elect to deactivate a billing entity relationship retained in the vault. When this occurs, authorization transactions submitted from the billing entity must be declined. A billing entity status field will be required in the vault database. The following flow describes this process.

User selects deactivate billing entity relationship in the vault application.

The Vault processing device sets the user's billing entity status to "deactivated".

Upon subsequent authorization requests:
The billing entity submits transaction authorization request.
The vault will decline the transaction based on the status of the billing entity relationship for the virtual account identifier.

The payment network or the billing entity may elect to deactivate all relationships associated with a billing entity, due to a data compromise event. When this occurs, authorization transactions submitted for existing billing entity relationships must be declined. Subsequent to this, the user will be required to re-activate the billing entity relationship. The following flow describes this process:

Compromise event is detected.
Platform administrator initiates billing entity reset function.
Billing entity reset function deactivates all accounts associated with the billing entity by setting the billing entity status field to "Deactivated".
Subsequent reactivation of the billing entity will require a new billing entity.
UCAF to be generated for each user billing entity relationship.

During Authorization, the vault will check the status of the billing entity in addition to checking the terms set by the user to determine if the transaction should be declined. If the billing entity is in a "Deactivated" state, then the transaction will be rejected.

If the account deactivation occurs due to issuer compromise the following steps may take place:

Compromise event is detected.
Platform administrator initiates the issuer reset function.
Issuer reset function deactivates all accounts associated with the issuer by setting billing entity status to "Deactivated" for all accounts associated with the issuer using a processing device.
Issuer will send batch file of original and reissued public virtual identifier and/or the private virtual identifier.
The vault will replace current the current the public virtual identifier and/or the private virtual identifier with reissued identifiers.
The vault will reset billing entity status from "Deactivated" to "Active".

Figure 13:
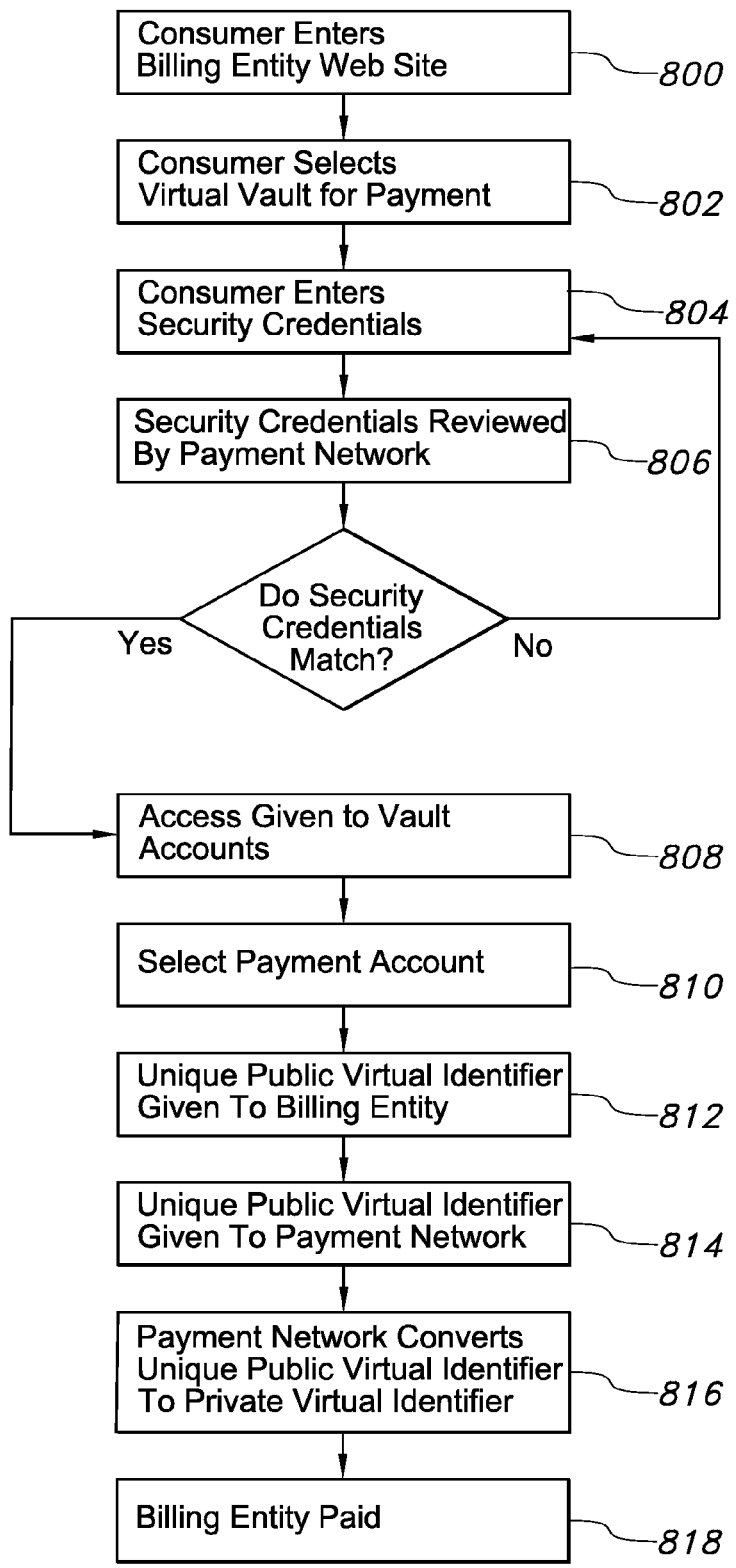
FIG. 13 depicts a flowchart of a method of using a virtual vault.

A typical manner in which the virtual vault may be used will now be described. With reference to FIG. 13, a consumer once registered with the vault as described above may enter a billing entity's web site to make a payment wherein the billing entity that has also registered with the vault 800. The consumer may make a purchase or payment for goods or services already received. The billing entity web site may provide an option to pay by credit/debit cart to pay via the virtual vault. The consumer may select the virtual vault option 802. They would then need to enter their security credentials to access this payment option 804. The payment network administering the vault would review the credentials 806 and make a determination if the credentials matched those stored in its database 807. The credentials may include a user ID and password. If the credentials match, the consumer may be given access to the listing of accounts stored in the vault 808. If the credentials do not match the consumer may be returned to step 804 wherein the consumer is asked to renter the credentials. Alternatively, the consumer may be returned to the billing entity with a message indicating that the vault is not available as a payment option.

A user may have placed one or more financial accounts in the vault in the form of credit cards, debits cards or bank accounts. Once given access to the vault, the user would then select the financial account they wish to use to pay the billing entity 810. Upon selection of the account, the payment network processing device would submit to the public virtual identifier unique to the specific consumer/billing entity relationship to be used to process the transaction 812. The billing entity would submit the public virtual identifier to the payment network 814 which would then convert it to the private virtual identifier 816 and submit the payment request to the financial institution using the private identifier. The billing entity would then be paid using standard payment processing systems such as those used for processing credit card payments 818. During this process, the billing entity never receives the private virtual identifier.

The present invention could also be used to make payments over the phone by a consumer who has previously registered with the vault. A customer could call the billing entity and request payment using the vault. The consumer may then be switched to the payment network that administers the vault. The consumer may be asked to provide security credentials. In addition to the security credentials, the payment network could also verify the consumer's identity by comparing the phone number the consumer is calling from with that stored in the database. Once the consumer is verified, they be given a public virtual identifier and switched back to the billing entity. The consumer would then provide the public virtual identifier to the billing entity. In this embodiment, the public virtual identifier may be unique to that specific transaction and only be used for that transaction. Alternatively, the public virtual identifier may only be unique to the consumer billing entity relationship.

In addition to providing a secure method and system for making payments, the present invention can also be used to authenticate an individual for non-payment transactions. The authentication permits for the identity of an individual to be verified with a high level of confidence. Accordingly, transactions requiring such verification can be conducted over computer networks such as the internet. When an individual sets up a virtual vault account with a financial institution, they must provide certain information so that the financial institution associated with the vault is certain of the individual's identity. In setting up the virtual vault, a user name and password is selected by the individual to permit access to the vault. Other identifying information can be entered and stored in the vault such as social security number, address, and answers to security questions which may provide personal and unique information about the individual.

Entities seeking to verify an individual may operably connect their computer system to that of the payment network. If an individual seeks to use the entity's web site to obtain access, they would be presented with a virtual vault option. The individual who has previously registered with a virtual vault could then enter their user name and password. The payment network processing device would review this information and if it matches the information in its database, the payment network would generate a message to the entity verifying the identity of the individual. Depending on the degree of certainty desired, the entity may want additional information entered, such as a social security number address, phone number, etc. Once entered, this information could be verified by the payment network. With the individual authenticated, an authentication message could be sent to a processing device of the entity, and the entity may allow access to confidential information.

For example, if an individual desires to obtain confidential information such as medical records, they may visit the website of the custodian of the records. In the case of medical records, the custodian may be the hospital's website. If the hospital has registered with the payment network a virtual vault option could be presented on the website. The individual may enter a username and password and any other information that may be requested to permit authentication. This information would be communicated to the payment network and verified. If verification is successful, then a message would be sent to the custodian. Access to the record may then be obtained.

In another example, the IRS may allow a consumer to remotely access their personal tax records if the consumer can properly authenticate themselves. The consumer may access the IRS website and enter the credential information associated with the virtual vault. The IRS may further require the last four digits of the consumer's social security number. An additional manner of verification may be to check if the computer being used to access the information has been used previously use when conducting a banking transaction. If all the information corresponds to that held in the virtual vault, a message can be sent to the IRS verifying the identity of the consumer seeking access.

Figure 14:
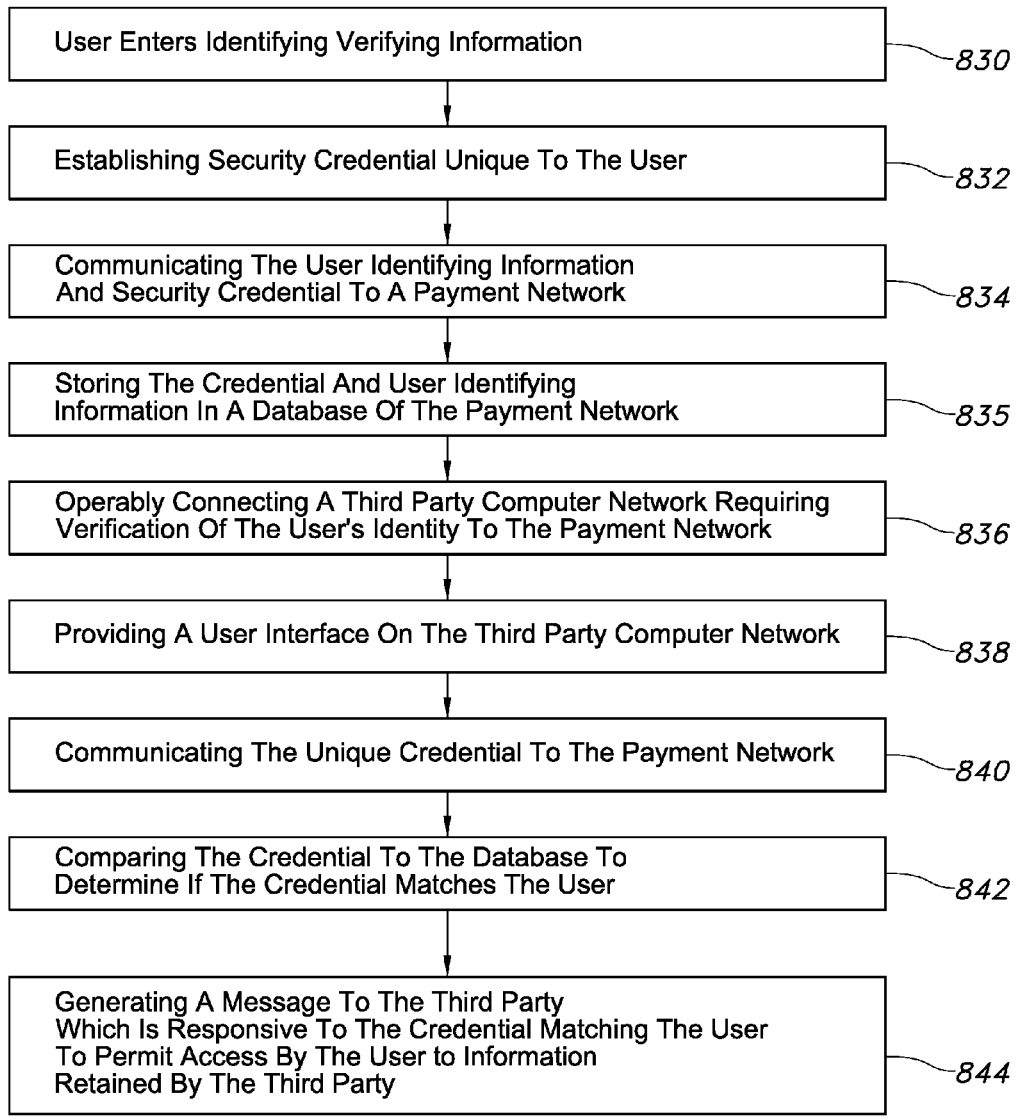
FIG. 14 depicts a flowchart of method of authenticating the identity of a user.

With reference to FIG. 14, the identity of a user may be authenticated over a computer network using the virtual vault. The user would register with an entity such as a financial institution in a manner as described above. During this registration the individual would enter a plurality of identifying verifying information 830. The user then creates a security credential such as a user name and password unique to the user to permit access to the registration 832. The user identity verifying information and security credential are communicated to a payment network 834 and stored in a database of the payment network 835. A third party computer network requiring verification of the user's identity, for example the hospital's consumer network set forth in the above example, is operably connected to the payment network 836. A user access point on the third party computer network is provided for a user to enter the unique credential in order to gain access to information stored by the third party 838. The unique credential is communicated to the payment network 840. The provided credential is compared to the credential stored in the database to determine if the credential matches the user 842. If the credential matches, a message is generated to the third party to permit access by the user to information retained by the third party 844.

Accordingly, the authentication feature provided by the virtual vault which is necessary for secure financial transactions may also be employed to facilitate other types of transactions where authentication is required.

Figure 15:
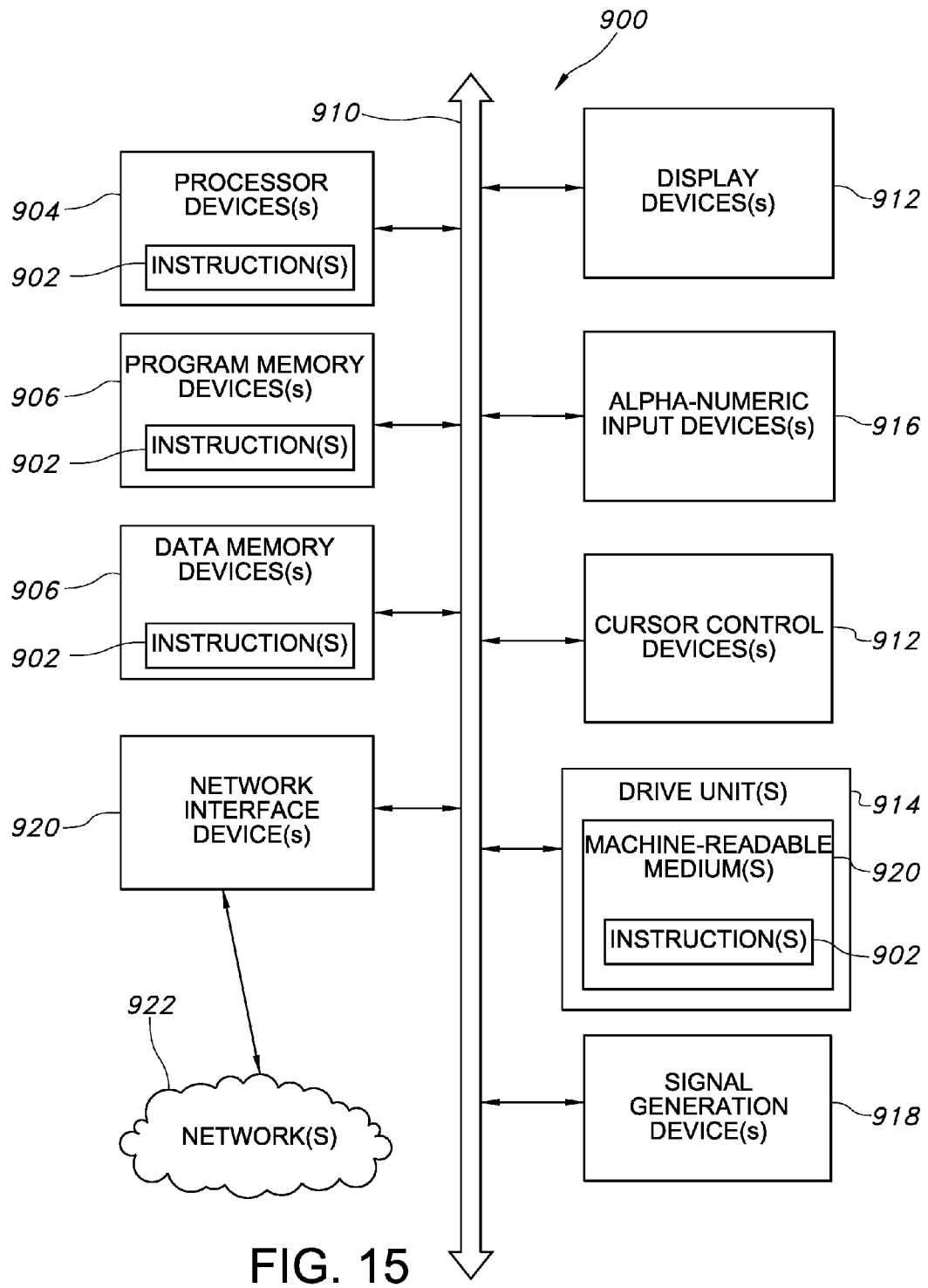
FIG. 15 is a high-level block diagram of a second implementation of the disclosed method using a processing device.

All of the above functions and methods can be implemented using computing systems, hardware, software and/or combinations thereof FIG. 15 is a block diagram of an embodiment of a machine in the form of a computing system 900, within which a set of instructions 902, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a Personal Digital Assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 700 may include a processing device(s) 904 (e.g., a central processing unit (CPU), a graphics processing unit (GPU), or both), program memory device(s) 906, and data memory device(s) 908, which communicate with each other via a bus 910. The computing system 900 may further include display device(s) 912 (e.g., liquid crystals display (LCD), a flat panel, a solid state display, or a cathode ray tube (CRT)). The computing system 900 may include input device(s) 916 (e.g., a keyboard), cursor control device(s) 912 (e.g., a mouse), disk drive unit(s) 914, signal generation device(s) 918 (e.g., a speaker or remote control), and network interface device(s) 920.

The disk drive unit(s) 914 may include machine-readable medium(s) 920, on which is stored one or more sets of instructions 902 (e.g., software) embodying any one or more of the methodologies or functions disclosed herein, including those methods illustrated herein. The instructions 902 may also reside, completely or at least partially, within the program memory device(s) 906, the data memory device(s) 908, and/or within the processing device(s) 904 during execution thereof by the computing system 900. The program memory device(s) 906 and the processing device(s) 904 may also constitute machine-readable media. Dedicated hardware implementations 904, but not limited to, application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 902, or that which receives and executes instructions 902 from a propagated signal so that a device connected to a network environment 922 can send or receive voice, video or data, and to communicate over the network 922 using the instructions 902. The instructions 902 may further be transmitted or received over a network 922 via the network interface device(s) 920. The machine-readable medium may also contain a data structure for storing data useful in providing a functional relationship between the data and a machine or computer in an illustrative embodiment of the disclosed systems and methods.

While the machine-readable medium 920 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method for processing demand deposit account ("DDA") payment transactions for an account holder comprising:

generating a private virtual identifier by a payment network transaction server including a processor and memory, the private virtual identifier being unknown to an account holder;

the payment network transaction server associating the private virtual identifier with a DDA number of the account holder;

generating by the payment network transaction server a public virtual identifier associated with the private virtual identifier;

distributing the public virtual identifier to the account holder;

receiving a DDA payment request from a billing entity, wherein the DDA payment request includes the public virtual identifier;

in response to the step of receiving the public virtual identifier in the DDA payment request, the payment network transaction server retrieving the private virtual identifier;

transmitting the private virtual identifier to a financial institution maintaining the DDA;

restricting access to the private virtual identifier to a payment network and the financial institution maintaining the DDA; and processing the DDA payment request using the private virtual identifier and facilitating payment to the billing entity on behalf of the account holder.

2. The method as defined in claim 1, wherein the public virtual identifier is used by the account holder to initiate a payment transaction with the billing entity.

3. The method as defined in claim 2, wherein the public virtual identifier is provided by the billing entity to the payment network for processing a payment over a computing system interconnecting the billing entity and the payment network.

4. The method as defined in claim 3, wherein upon receipt of the public virtual identifier, the payment network retrieves from a database the private virtual identifier corresponding to the public virtual identifier, the private virtual identifier being communicated over a computer network to a financial institution to transfer funds from the account holder's DDA associated with the financial institution.

5. The method as defined in claim 2, wherein the public virtual identifier is maintained in a password protected database administered by the payment network.

6. The method as defined in claim 5, wherein the password protected database is accessible by the account holder through a computer network of the billing entity.

7. The method as defined in claim 1, including generating a second public virtual identifier and associating a second public virtual identifier with a credit card primary account number PAN and permitting payment based on the credit card ("PAN") PAN using the second public virtual identifier, the second public virtual identifier being associated with the private virtual identifier.

8. A non-transitory computer-readable storage medium including instructions that, when executed by a processing device, cause the processing device to process demand deposit account ("DDA") payment transactions by performing a computer process comprising:

generating a private virtual identifier, the private virtual identifier being unknown to an account holder;

associating the private virtual identifier with a DDA number of an account holder;

generating a public virtual identifier associated with the private virtual identifier;

distributing the public virtual identifier to the account holder;

receiving a DDA payment request from a billing entity, wherein the DDA payment request includes the public virtual identifier;

retrieving the private virtual identifier in response to receipt of the public virtual identifier;

transmitting the private virtual identifier to a financial institution maintaining the DDA;

restricting access to the private virtual identifier to the payment network and the financial institution maintaining the DDA;

and processing the DDA payment request using the private virtual identifier and facilitating payment to the billing entity on behalf of the account holder.

9. The method as defined in claim 1, including generating a second public virtual identifier and associating the second public virtual identifier with the private virtual identifier.

10. The method as defined in claim 9, wherein the public virtual identifier is associated with a first billing entity-account holder entity relationship and the second public virtual identifier is associated with a second billing entity-account holder entity relationship distinct from the first billing entity-account holder entity relationship and both public virtual identifiers being associated with the same private virtual identifier.

11. A system for processing demand deposit account ("DDA") payment transactions comprising:

a memory having instructions stored thereon; and a processor, wherein the processor upon execution the instructions, is configured to:

generate a private virtual identifier, the private virtual identifier being unknown to an account holder;

associate the private virtual identifier with a DDA number of an account holder;

generate a public virtual identifier associated with the private virtual identifier;

distribute the public virtual identifier to the account holder;

receive a DDA payment request from a billing entity, wherein the DDA payment request includes the public virtual identifier;

retrieve the private virtual identifier in response to receipt of the public virtual identifier;

transmit the private virtual identifier to a financial institution maintaining the DDA;

restrict access to the private virtual identifier to the payment network and the financial institution maintaining the DDA;

and process the DDA payment request using the private virtual identifier and facilitating payment to the billing entity on behalf of the account holder.

* * * * *